US008708819B2

(12) United States Patent  
Kando et al.

(10) Patent No.: US 8,708,819 B2  
(45) Date of Patent: Apr. 29, 2014

(54) VIDEO GAME PROCESSING APPARATUS, VIDEO GAME PROCESSING METHOD, AND VIDEO GAME PROCESSING PROGRAM

(75) Inventors: Tatsuya Kando, Tokyo (JP); Tomohiro Hasegawa, Tokyo (JP); Takeshi Arakawa, Tokyo (JP)

(73) Assignee: Kabushiki Square Enix, Tokyo (JP)

( * ) Notice: Subject to any disclaimer, the term of this patent is extended or adjusted under 35 U.S.C. 154(b) by 1670 days.

(21) Appl. No.: 11/946,391

(22) Filed: Nov. 28, 2007

(65) Prior Publication Data

US 2008/0146333 A1 Jun. 19, 2008

(30) Foreign Application Priority Data

Dec. 4, 2006 (JP) .................................. 2006-327295

(51) Int. Cl.
*A63F 9/00* (2006.01)

(52) U.S. Cl.
USPC .......................................................... 463/33

(58) Field of Classification Search
USPC .......................................................... 463/43
See application file for complete search history.

(56) References Cited

U.S. PATENT DOCUMENTS

| | | | | | |
|---|---|---|---|---|---|
| 5,558,339 | A | * | 9/1996 | Perlman ........................... | 463/42 |
| 5,738,583 | A | * | 4/1998 | Comas et al. ..................... | 463/40 |
| 6,045,447 | A | * | 4/2000 | Yoshizawa et al. ............... | 463/31 |
| 6,383,075 | B1 | * | 5/2002 | Jeong et al. ...................... | 463/39 |
| 6,655,284 | B1 | * | 12/2003 | Hoshii et al. .................... | 101/484 |
| 6,736,727 | B1 | * | 5/2004 | Doi et al. .......................... | 463/42 |
| 6,769,915 | B2 | * | 8/2004 | Murgia et al. ................... | 434/236 |
| 6,816,944 | B2 | * | 11/2004 | Peng ............................... | 711/133 |
| 7,240,093 | B1 | * | 7/2007 | Danieli et al. ................... | 709/205 |
| 7,814,156 | B2 | * | 10/2010 | Sasaki et al. .................... | 709/206 |
| 2001/0008852 | A1 | * | 7/2001 | Izumi ............................... | 463/42 |
| 2001/0031653 | A1 | * | 10/2001 | Oe et al. ............................ | 463/1 |
| 2001/0052075 | A1 | * | 12/2001 | Feinberg ......................... | 713/168 |
| 2002/0049086 | A1 | * | 4/2002 | Otsu ................................. | 463/42 |
| 2002/0160838 | A1 | * | 10/2002 | Kim ................................. | 463/42 |
| 2003/0008714 | A1 | * | 1/2003 | Tajiri et al. ....................... | 463/43 |
| 2003/0040347 | A1 | * | 2/2003 | Roach et al. ...................... | 463/1 |

(Continued)

FOREIGN PATENT DOCUMENTS

JP 2005-028103 2/2005

OTHER PUBLICATIONS

English language Abstract of JP 2005-028103.

(Continued)

*Primary Examiner* — Seng H Lim
(74) *Attorney, Agent, or Firm* — Greenblum & Bernstein, P.L.C.

(57) ABSTRACT

To increase a variety in playing a game, while achieving an effective utilization of a communication function, by actively using, in a video game, various kinds of information communicated between game apparatus when exchanging information relating to the game by means of wireless communication. Referring to various kinds of information, such as terminal category information, which indicates a category of a terminal transmitted and received by means of wireless communication between a game apparatus main body 10 and another game apparatus main body, terminal identification information for identifying the terminal, software identification information for identifying software of a video game being used in the apparatus main body, and communication history information, which indicates a history of the communication, exchangeable information, which indicates information exchangeable between the apparatus main bodies, is transmitted and received, and the received exchangeable information is converted into usable information, which indicates information usable in a video game of the game apparatus main body 10, and used.

20 Claims, 9 Drawing Sheets

(56) References Cited

U.S. PATENT DOCUMENTS

| | | | |
|---|---|---|---|
| 2004/0082383 A1* | 4/2004 | Muncaster et al. | 463/39 |
| 2004/0128319 A1* | 7/2004 | Davis et al. | 707/104.1 |
| 2005/0210120 A1* | 9/2005 | Yukie et al. | 709/217 |
| 2006/0277446 A1* | 12/2006 | Ikeno et al. | 714/47 |
| 2007/0013515 A1* | 1/2007 | Johnson et al. | 340/568.1 |
| 2007/0218992 A1 | 9/2007 | Maehiro et al. | |
| 2007/0265046 A1 | 11/2007 | Sato | |
| 2007/0265047 A1 | 11/2007 | Nomura | |
| 2007/0298879 A1* | 12/2007 | Kobayashi et al. | 463/31 |
| 2008/0000750 A1* | 1/2008 | Ueda et al. | 194/217 |
| 2008/0102958 A1* | 5/2008 | Kitamura et al. | 463/42 |
| 2008/0139310 A1* | 6/2008 | Kando et al. | 463/33 |

OTHER PUBLICATIONS

U.S. Appl. No. 11/846,924 to Hasegawa et al., which was filed on Aug. 29, 2007.

U.S. Appl. No. 11/947,367 to Kando et al, which was filed on Nov. 29, 2007.

U.S. Appl. No. 11/846,755 to Kando et al, which was filed on Aug. 29, 2007.

\* cited by examiner

VIDEO GAME PROCESSING APPARATUS, VIDEO GAME PROCESSING METHOD, AND VIDEO GAME PROCESSING PROGRAM

CROSS REFERENCE TO RELATED APPLICATION

The present disclosure relates to subject matter contained in Japanese Patent Application No. 2006-327295, filed on Dec. 4, 2006, the disclosure of which is expressly incorporated herein by reference in its entirety.

BACKGROUND OF THE INVENTION

1. Technical Field

The present invention relates to a technology for, as well as controlling an implementation of a video game by displaying a player character on a display screen of an image display device, and controlling behavior of the player character displayed on the display screen in accordance with an operation by a player, having a function as a terminal which carries out a wireless communication, and carrying out a transmission and reception of information relating to the video game.

2. Related Art

To date, a variety of games called RPG's (role playing game: a game played by a player acting a role of a character in a game world and, while enjoying a process of growing via a variety of experiences, achieving a predetermined objective) have been provided.

In these RPG's, generally, by a player character which acts in accordance with an operation by the player winning a battle with an enemy character which hampers the achievement of the predetermined objective, various privileges, such as an experience value or an item, are given to the player character.

Also, in recent years, in this kind of RPG, it has become popular, using wireless communication or the like, to exchange information relating to a game, such as an item, with an unspecified number of other players, and carry out a playing of the game.

For example, there has been one in which, including a plurality of portable game apparatus, the portable game apparatus, using a wireless communication unit, carry out communication with other portable game apparatus existing within a communication range and, in the event that a communication condition is established, transmit and receive exchange condition information, for exchanging information relating to the game, to and from each other and, in the event that exchange conditions match, exchange the information relating to the game (for example, refer to JP-A-2005-28103).

However, with the game apparatus disclosed in JP-A-2005-28103, as the exchange conditions indicated by the exchange condition information are set in such a way that, for example, it is possible to exchange the information relating to the game in the event that games being executed in each game apparatus match, or the like, the exchange of the information relating to the game is not carried out between game apparatus which do not meet this condition, even though terminals of the apparatus are of the same kind. Also, in the case of not meeting the exchange conditions, it often happens that various kinds of information communicated between the game apparatus (terminal identification information and the like) are also destroyed without being used. For this reason, there is a problem in that it can happen that, for a player executing a game which few people are playing, an enjoyment of carrying out the exchange of the information relating to the game with other players wanes, and a variety in playing the game decreases.

SUMMARY OF THE INVENTION

An object of the invention is, by eliminating the heretofore described problem, and actively using, in a video game, the various kinds of information communicated between the game apparatus when exchanging the information relating to the game by means of the wireless communication, to make it possible to increase the variety in playing the game, while achieving an effective utilization of a communication function.

A video game processing apparatus of the invention (for example, a video game apparatus 100, and a video game apparatus main body 10) which, as well as controlling an implementation of a video game by controlling behavior of a player character, displayed on a display screen of an image display device, in accordance with an operation by a player, having a function as a terminal which carries out wireless communication, carries out a transmission and reception of information relating to the video game, includes: a terminal category information transceiving device which, in accordance with a request from another apparatus main body differing from an own apparatus main body, for a transmission of terminal category information indicating a category of a terminal, as well as transmitting the terminal category information to the other apparatus main body in order to exchange the terminal category information between terminals, receives terminal category information from the other apparatus main body; a terminal category determination device which, comparing the terminal category information of the other apparatus main body received by the terminal category information transceiving device, and the terminal category information of the own apparatus main body, determines whether or not the terminal categories of the other apparatus main body and the own apparatus main body are the same; a connection establishment device which, depending on a determination result from the terminal category determination device, establishes a connection with the other apparatus main body by means of a one-on-one wireless communication; a terminal identification information transceiving device which, as well as transmitting terminal identification information, for individually identifying a terminal, to the other apparatus main body by means of the wireless communication, receives terminal identification information from the other apparatus main body by means of the wireless communication; a communication determination device which, based on the terminal identification information of the other apparatus main body received by the terminal identification information transceiving device, determines whether or not the other apparatus main body is a terminal which has carried out the wireless communication with the own apparatus main body within a predetermined period; a recording starting device which, depending on a determination result from the communication determination device, starts a recording of communication history information indicating a history of the wireless communication between the terminals; a software identification information transceiving device which, as well as transmitting software identification information, for identifying software of the video game included in the own apparatus main body, to the other apparatus main body, receives software identification information of the software included in the other apparatus main body from the other apparatus main body; a software determination device which, comparing the software identification information of the other apparatus main body received by the software identification information transceiving device, and the software identification information of the own apparatus main body, determines whether or not the kinds of software are the same; an exchangeable information transceiving device which, depending on a determination result from the software determination device, as well as transmitting exchangeable information, indicating information relating to the software exchangeable between the terminals, to the other apparatus main body, receives exchangeable information from the other apparatus main body; a recording finishing device which, depending on a determination result from the software determination device, finishes the recording of the communication history information; an information converting device which, along with the recording finishing device having finished the recording of the communication history information, converts the exchangeable information received by the exchangeable information transceiving device into usable information indicating information usable in the software of the own apparatus main body; and a connection severing device which severs the connection by means of the wireless communication between the own apparatus main body and the other apparatus main body.

By configuring in the heretofore described way, based on information such as the terminal category of each apparatus main body, and the kind of software of the video game included in each apparatus main body, even in the event, for example, that there is no uniformity among them, it being possible to actively use the various kinds of information, such as the information on the communication history between the apparatus main bodies, in the video game when exchanging the information relating to the game by means of the wireless communication, it is possible to increase the variety in playing the game, while achieving the effective utilization of the communication function.

It is also acceptable to configure in such a way that, the apparatus further including a communication history information saving device which, in the event that the terminal category determination device determines that the categories of the other apparatus main body and the own apparatus main body are not the same, saves the information on the history of the communication with the other apparatus main body carried out thus far, along with the terminal identification information of the other apparatus main body, the information converting device converts the communication history information saved by the communication history information saving device into the usable information. By configuring in such a way, as it is possible, even in the event that the categories of the apparatus main bodies are not the same, to actively use the communication history information in the video game, it is possible to increase the variety in playing the game, while achieving the effective utilization of the communication function.

It is also acceptable to configure in such a way that, the apparatus further including a connection establishment quantity recording device which, in the event that the terminal category determination device determines that the categories of the other apparatus main body and the own apparatus main body are the same, and the software determination device determines that the kinds of software are the same, records a quantity of establishments of the connection by the connection establishment device, the connection severing device, in the event that the quantity recorded by the connection establishment quantity recording device has reached a preset regulation quantity, severs the connection by means of the wireless communication. By configuring in such a way, in the event that the categories of the apparatus main bodies and the kinds of software are both the same, it is possible to arrange in such a way that the connection by means of the wireless communication is not established a number of times equal to or greater than the regulation number and, it being possible to save the regulation number of items of the communication history information, and actively use them in the video game, without compressing a storage area of the communication history information, it is possible to increase the variety in playing the game, while achieving the effective utilization of the communication function.

It is also acceptable to configure in such a way that, the apparatus further including a capability icon display device, which displays the usable information converted by the information converting device on the display screen as a capability icon indicating a feasibility level for giving a special effect to behavior of the player character, the capability icon display device displays, along with the capability icon, at least one from among a remaining feasibility value or a level of the feasibility level on the display screen. By configuring in such a way, while increasing the interest in the game by displaying the various kinds of information relating to the feasibility level of the player character on the display screen efficiently, and easily viewable by the player, it is possible, actively using the various kinds of information arising from the wireless communication in the video game, to achieve the effective utilization of the communication function, and increase the variety in playing the game.

It is also acceptable to configure in such a way that the capability icon display device displays the remaining feasibility value and the level on the display screen by means of alphanumeric characters or a meter. By configuring in such a way, while increasing the interest in the game by displaying the various kinds of information relating to the feasibility level of the player character on the display screen efficiently, and easily viewable by the player, it is possible, actively using the various kinds of information arising from the wireless communication in the video game, to achieve the effective utilization of the communication function, and increase the variety in playing the game.

Also, a video game processing method which, as well as controlling an implementation of a video game by controlling behavior of a player character, displayed on a display screen of an image display device, in accordance with an operation by a player, carries out a transmission and reception of information relating to the video game with a video game processing apparatus having a function as a terminal which carries out wireless communication, includes: a terminal category information transceiving process which, in accordance with a request from another apparatus main body differing from an own apparatus main body, for a transmission of terminal category information indicating a category of a terminal, as well as transmitting the terminal category information to the other apparatus main body in order to exchange the terminal category information between terminals, receives terminal category information from the other apparatus main body; a terminal category determination process which, comparing the terminal category information of the other apparatus main body received by the terminal category information transceiving process, and the terminal category information of the own apparatus main body, determines whether or not the terminal categories of the other apparatus main body and the own apparatus main body are the same; a connection establishment process which, depending on a determination result from the terminal category determination process, establishes a connection with the other apparatus main body by means of a one-on-one wireless communication; a terminal identification information transceiving process which, as well as transmitting terminal identification information, for individually identifying a terminal, to the other apparatus main body by means of the wireless communication, receives terminal identification information from the other apparatus main body by means of the wireless communication; a communication determination process which, based on the terminal identification information of the other apparatus main body received by the terminal identification information transceiving process, determines whether or not the other apparatus main body is a terminal which has carried out the wireless communication with the own apparatus main body within a predetermined period; a recording starting process which, depending on a determination result from the communication determination process, starts a recording of communication history information indicating a history of the wireless communication between the terminals; a software identification information transceiving process which, as well as transmitting software identification information, for identifying software of the video game included in the own apparatus main body, to the other apparatus main body, receives software identification information of the software included in the other apparatus main body from the other apparatus main body; a software determination process which, comparing the software identification information of the other apparatus main body received by the software identification information transceiving process, and the software identification information of the own apparatus main body, determines whether or not the kinds of software are the same; an exchangeable information transceiving process which, depending on a determination result from the software determination process, as well as transmitting exchangeable information, indicating information relating to the software exchangeable between the terminals, to the other apparatus main body, receives exchangeable information from the other apparatus main body; a recording finishing process which, depending on a determination result from the software determination process, finishes the recording of the communication history information; an information converting process which, along with the recording finishing process having finished the recording of the communication history information, converts the exchangeable information received by the exchangeable information transceiving process into usable information indicating information usable in the software of the own apparatus main body; and a connection severing process which severs the connection by means of the wireless communication between the own apparatus main body and the other apparatus main body.

Furthermore, a video game processing program which, as well as causing a control of an implementation of a video game by controlling behavior of a player character, displayed on a display screen of an image display device, in accordance with an operation by a player, causes a carrying out of a transmission and reception of information relating to the video game with a video game processing apparatus having a function as a terminal which carries out wireless communication, causes a computer to execute: a terminal category information transceiving process which, in accordance with a request from another apparatus main body differing from an own apparatus main body, for a transmission of terminal category information indicating a category of a terminal, as well as transmitting the terminal category information to the other apparatus main body in order to exchange the terminal category information between terminals, receives terminal category information from the other apparatus main body; a terminal category determination process which, comparing the terminal category information of the other apparatus main body received by the terminal category information transceiving process, and the terminal category information of the own apparatus main body, determines whether or not the terminal categories of the other apparatus main body and the own apparatus main body are the same; a connection establishment process which, depending on a determination result from the terminal category determination process, establishes a connection with the other apparatus main body by means of a one-on-one wireless communication; a terminal identification information transceiving process which, as well as transmitting terminal identification information, for individually identifying a terminal, to the other apparatus main body by means of the wireless communication, receives terminal identification information from the other apparatus main body by means of the wireless communication; a communication determination process which, based on the terminal identification information of the other apparatus main body received by the terminal identification information transceiving process, determines whether or not the other apparatus main body is a terminal which has carried out the wireless communication with the own apparatus main body within a predetermined period; a recording starting process which, depending on a determination result from the communication determination process, starts a recording of communication history information indicating a history of the wireless communication between the terminals; a software identification information transceiving process which, as well as transmitting software identification information, for identifying software of the video game included in the own apparatus main body, to the other apparatus main body, receives software identification information of the software included in the other apparatus main body from the other apparatus main body; a software determination process which, comparing the software identification information of the other apparatus main body received by the software identification information transceiving process, and the software identification information of the own apparatus main body, determines whether or not the kinds of software are the same; an exchangeable information transceiving process which, depending on a determination result from the software determination process, as well as transmitting exchangeable information, indicating information relating to the software exchangeable between the terminals, to the other apparatus main body, receives exchangeable information from the other apparatus main body; a recording finishing process which, depending on a determination result from the software determination process, finishes the recording of the communication history information; an information converting process which, along with the recording finishing process having finished the recording of the communication history information, converts the exchangeable information received by the exchangeable information transceiving process into usable information indicating information usable in the software of the own apparatus main body; and a connection severing process which severs the connection by means of the wireless communication between the own apparatus main body and the other apparatus main body.

According to the invention, by actively using, in a video game, the various kinds of information communicated between the game apparatus when exchanging the information relating to the game by means of the wireless communication, it is possible to increase the variety in playing the game, while achieving the effective utilization of the communication function.

DESCRIPTION OF THE PREFERRED EMBODIMENT(S)

Hereafter, a description will be given, with reference to the drawings, of one embodiment of the invention.

Figure 1:
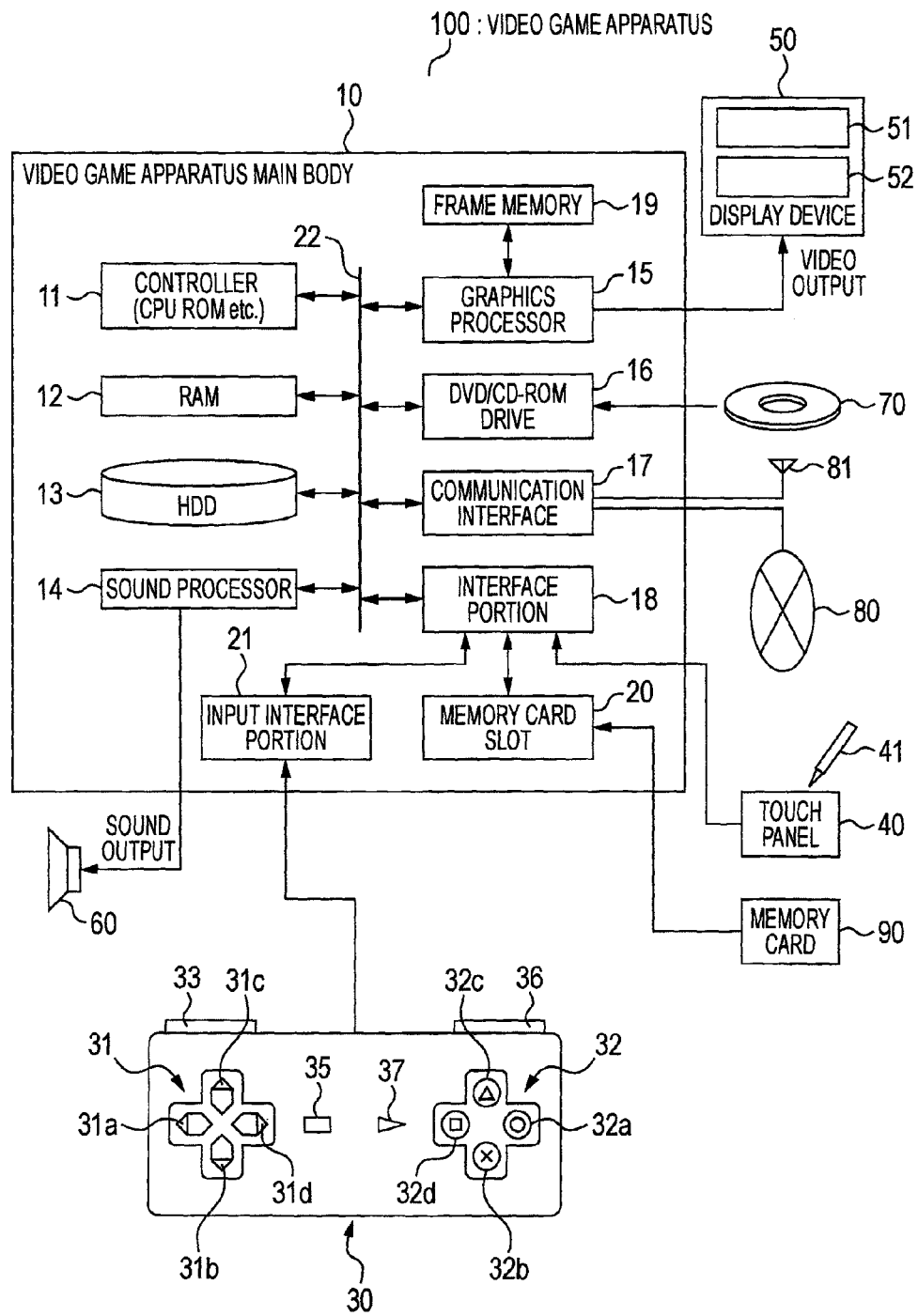
FIG. 1 is a block diagram showing an example of a configuration of a video game apparatus in one embodiment of the invention.

FIG. 1 is a block diagram showing an example of a configuration of a video game apparatus 100 in the one embodiment of the invention.

As shown in FIG. 1, the video game apparatus 100 of the embodiment includes a video game apparatus main body 10, a display device 50, and a sound transmission device 60. The video game apparatus main body 10 is configured of, for example, an over-the-counter video game machine or a portable game machine. Also, the display device 50, being configured of, for example, a television device, a liquid crystal display device or the like, has a plurality of image display portions, which are an upper image display portion 51 and a lower image display portion 52.

The video game apparatus main body 10 includes a controller 11, an RAM 12, a hard disc drive (HDD) 13, a sound processor 14, a graphics processor 15, a DVD/CD-ROM drive 16, a communication interface 17, an interface portion 18, a frame memory 19, a memory card slot 20, and an input interface portion 21.

The controller 11, the RAM 12, the hard disc drive (HDD) 13, the sound processor 14, the graphics processor 15, the DVD/CD-ROM drive 16, the communication interface 17, and the interface portion 18 of the video game apparatus main body 10 are each connected to an internal bus 22.

The controller 11, including a CPU, an ROM and the like, carries out a control of a whole of the video game apparatus 100, in accordance with a control program stored in the HDD 13 or a storage medium 70. The controller 11 is equipped with an internal timer used for, for example, generating a timer interruption or the like. The RAM 12 is used mainly as a work area of the controller 11. The HDD 13 is a storage area in the video game apparatus main body 10 for saving the control program and various kinds of data.

The sound processor 14, being equipped with a function of a sound input-output interface which carries out a D/A conversion and an A/D conversion of a sound signal, is connected to the sound transmission device 60 configured of, for example, a speaker. The sound processor 14, in accordance with a sound transmission instruction from the controller 11, which is executing a process in accordance with various kinds of control program, transmits a sound signal to the sound transmission device 60.

Also, the sound processor 14, being connected to an unshown sound input device configured of, for example, a microphone, inputs a sound signal from the sound input device in accordance with a sound input instruction from the controller 11. It is also acceptable that the sound transmission device 60 is built into the display device 50 or the video game apparatus main body 10.

The graphics processor 15 is, for example, connected to the display device 50, which has the upper image display portion 51 and the lower image display portion 52, on which an image display is performed. The graphics processor 15, in accordance with a drawing command from the controller 11, as well as placing an image in the frame memory 19, transmits a video signal for causing a display of the image on the upper and lower image display portions 51 and 52 to the display device 50. A switching time of the image displayed by the video signal is taken as, for example, one thirtieth of a second per frame.

The storage medium 70, such as a DVD-ROM or a CD-ROM, in which a game control program is stored is loaded in the DVD/CD-ROM drive 16. The DVD/CD-ROM drive 16 carries out a process reading various kinds of data, such as the control program, from the loaded storage medium 70.

It is acceptable that the storage medium 70, apart from the DVD-ROM or CD-ROM, is any kind of DVD (such as a DVD-RAM, a DVD-R, a DVD-RW, a DVD+R, a DVD+RW, a DVD+R DL, a DVD-R DL, a BlueRay Disc, or an HD DVD), or any kind of CD (such as a CD-R or a CD-RW). In this case, it is also acceptable that the video game apparatus main body 10 includes, in place of the DVD/CD-ROM drive 16 or in addition to the DVD/CD-ROM drive 16, a drive which carries out a process reading and writing the various kinds of data from and onto the storage medium 70.

The communication interface 17 is connected to a communication network 80, such as an internet, wirelessly or by wire. Also, the communication interface 17 is wirelessly connected to another video game apparatus main body 10, via an unshown communication unit which has an antenna 81. The video game apparatus main body 10 carries out, for example, a communication with another computer, via the communication network 80, using a communication function in the communication interface 17, or carries out, for example, a wireless communication with the other video game apparatus main body 10, using the antenna 81. Consequently, the video game apparatus main body 10 has a function as a communication terminal.

The input interface portion 21, the memory card slot 20, and a touch panel 40, as an operation input portion (a controller) are connected to the interface portion 18. The interface portion 18 stores instruction data from the input interface portion 21, based on an operation by a player of a keypad 30, and instruction data based on an operation by the player of the touch panel 40 using a touch pen 41 or the like, in the RAM 12. Then, the controller 11 executes various kinds of calculation process in accordance with the instruction data stored in the RAM 12.

It is sufficient that the touch panel 40 is, for example, used laminated on a display screen side of at least either one of the upper and lower image display portions 51 and 52. In this case, by managing and controlling a timing of a display on a side of the upper and lower image display portions 51 and 52 on which the touch panel 40 is laminated, and a timing and position coordinates of an operation of the touch panel 40 using the touch pen 41 or the like, the controller 11 recognizes input information in accordance with an operation input resulting from an input operation by the player.

In this way, by laminating the touch panel 40 on the display screen of at least either one of the upper and lower image display portions 51 and 52, it is possible, in combination with the keypad 30, to carry out an input of a large amount of information, without enlarging an aspect of the player's operation system. Herein, as a kind of the touch panel 40, it is possible to use various kinds of heretofore known touch panel, such as a resistive touch type or a pressure-sensitive type. It is also acceptable that the display device 50, rather than being one which has the plurality of image display portions, like the upper and lower image display portions 51 and 52, is one which configures the display screen with one image display portion.

The video game apparatus main body 10 configured in this way, as well as being connected to the touch panel 40 via the interface portion 18, as heretofore described, is connected to the keypad 30, which acts as the operation input portion (the controller), via the input interface portion 21. It is acceptable that the keypad 30 is provided either configured integrated with the video game apparatus main body 10, or as a separate entity.

For example, a cross key 31 and a button group 32 being disposed on an upper portion of a front side of the keypad 30, an up key 31a, a down key 31b, a right key 31c and a left key 31d are included in the cross key 31, while a ○ button 32a, a X button 32b, a Δ button 32c and a □ button 32d are included in the button group 32. Also, a select button 35 and a start button 37 are disposed on a connecting portion of a base on which the cross key 31 is disposed and a base on which the button group 32 is disposed. Furthermore, a plurality of buttons, such as an R1 button 36 and an L1 button 33, are also disposed on a side portion of the keypad 30. Apart from this, although omitted from the figure, it is also acceptable that a joystick or the like is disposed on the keypad 30.

The keypad 30 configured in this way including switches linked one to each of the cross key 31, the ○ button 32a, the X button 32b, the Δ button 32c, the □ button 32d, the select button 35, the start button 37, the R1 button 36 and the L1 button 33, and the like, on a pressing force being applied to each button, a corresponding switch, for example, is activated. A detection signal corresponding to an activation/deactivation of the switch is generated in the keypad 30. Also, in the case in which the joystick is disposed, a detection signal corresponding to a tilting orientation of the joystick is generated in the keypad 30.

The switch system detection signal generated in the keypad 30 is supplied to the input interface portion 21 and, by the detection signal from the keypad 30 being directed through the input interface portion 21, it becomes detection information which indicates which button or the like on the keypad 30 has been pressed. Also, in the case in which the joystick has been provided, the joystick system detection signal becomes detection information indicating a condition of the joystick. In this way, an operation order (the operation input) from a user (the player) performed on the keypad 30 is given to the video game apparatus main body 10.

Also, the interface portion 18, in accordance with instructions from the controller 11, carries out a process which stores data indicating an implementation status of a game, stored in the RAM 12, on a memory card 90 loaded in the memory card slot 20, a process which reads data on a game at a time of interruption saved on the memory card 90, and transfers them to the RAM 12, and the like.

Various kinds of data, such as the control program, for carrying out the game with the video game apparatus 100 are stored in, for example, the storage medium 70. The various kinds of data, such as the control program, stored in the storage medium 70 are read by the DVD/CD-ROM drive 16 in which the storage medium 70 is loaded, and loaded in the RAM 12.

The controller 11, in accordance with the control program loaded in the RAM 12, executes various kinds of process, such as a process which transmits the drawing command to the graphics processor 15, and a process which transmits the sound transmission instruction to the sound processor 14. While the controller 11 is executing the processes, data which originate intermediately in accordance with the implementation status of the game (for example, data which show a game score, a condition of a player character, or the like) are saved in the RAM 12, which is used as a work memory.

A three-dimensional video game according to the embodiment is taken to be a game including a portion in which the game is implemented by a plurality of characters such as the player character (PC: a character which acts in accordance with an operation by the player of the keypad 30 or the touch screen 40) moving on a field provided in a hypothetical three-dimensional space displayed on the display screens of the upper and lower image display portions 51 and 52. The three-dimensional space in which the field is formed is taken to be indicated by a world coordinate system. Also, the field being configured of a plurality of planes, it is expressed with coordinates of an apex of each configuration plane as feature points.

Next, a description will be given of an operation of the video game apparatus 100 of the embodiment.

Herein, in order to simplify the description, it being taken that only at least one player character PC and a plurality of non-player characters (NPC: characters which act in accordance with a control by the game machine (specifically, a control by the controller 11)) exist as objects which act in the hypothetical three-dimensional space, it can happen that there is a case in which a description of a process other than those particularly related to the invention is omitted. In the embodiment, it is taken that a video game control and communication are executed for an RPG.

Figure 2:
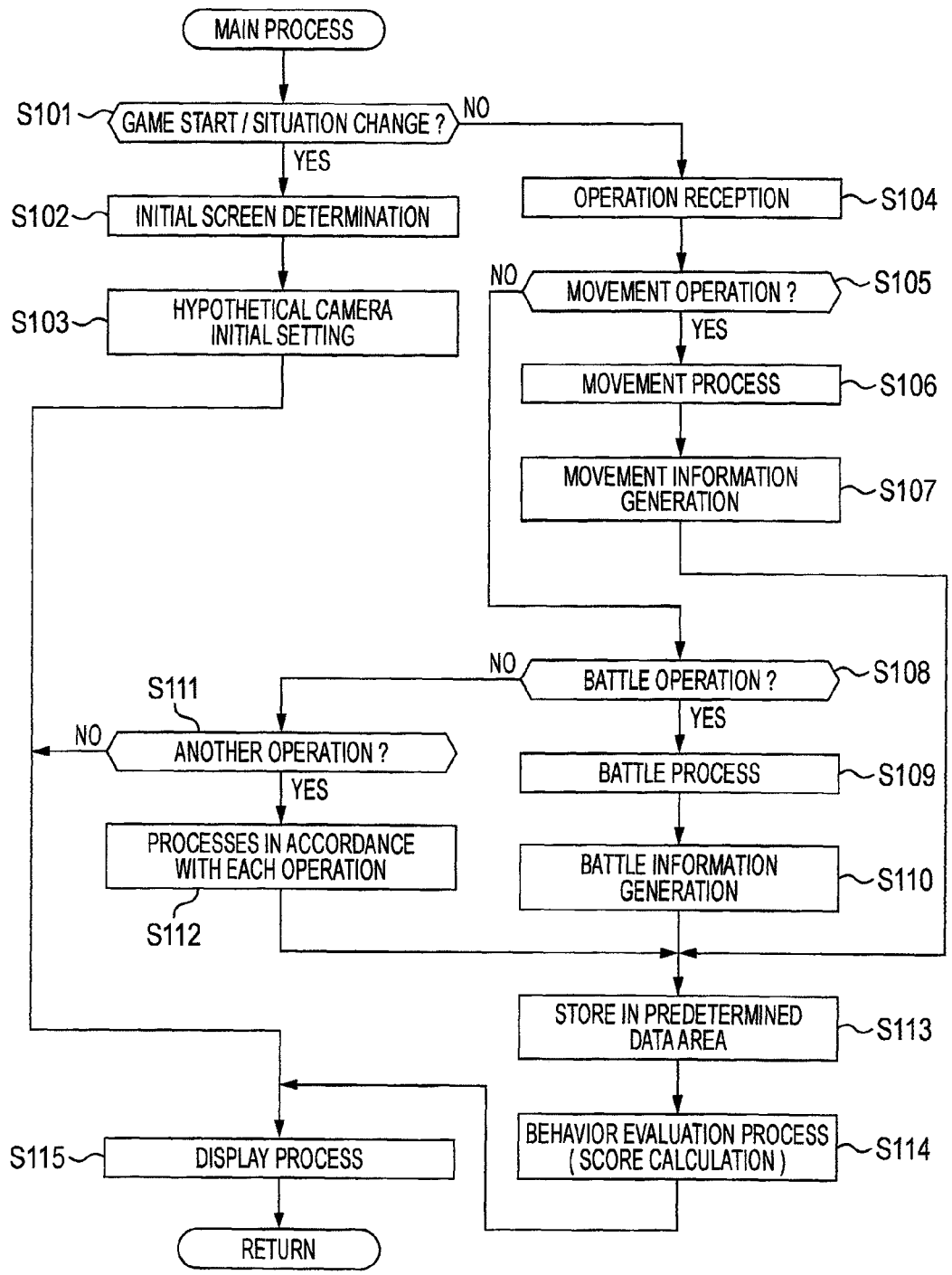
FIG. 2 is a flowchart showing an example of a main process.

FIG. 2 is a flowchart showing an example of a main process in the video game apparatus 100 of the embodiment. The main process being, for example, a process for generating one frame's worth of images, and processes necessary for the control of the video game, it is executed in accordance with the timer interruption every one thirtieth of a second. The heretofore mentioned "one thirtieth of a second" being one example, it is also acceptable that the main process is, for example, executed in accordance with a timer interruption every one field period (one sixtieth of a second) or, depending on a throughput, executed in accordance with a timer interruption every two frame periods (one fifteenth of a second).

In the embodiment, the game being one implemented on a common field on which various kinds of behavior, including the movement of the player character PC and a battle involving the player character PC, are permitted, a stage finishes when a predetermined objective on the field is achieved, and the game shifts to a next stage on the field.

Also, in the embodiment, each character appearing on the field in a battle scene being given an identical time axis, on once appearing, they move on the field or remain stationary on the field, in accordance with the identical time axis, for as long as HP (hit points: a value expressing a life force (a life value)) do not reach zero. In a battle scene in which only one player character PC appears, in the event that the player character PC's HP reach zero, the player character PC is in a condition in which it is unable to do battle, and the game finishes, or another event occurs.

However, in the embodiment, in a case in which, for example, a plurality of player characters PC appear, it is taken that none of the player characters PC is in the condition in which it is unable to do battle unless the player characters PC's HP all reach zero. That is, even in the event that, for example, one player character PC's HP have reached zero, when another player character PC's HP remain, it is possible for each player character PC, including the first player character PC, to maintain a battle condition. A portion which is displayed as a character image on the upper and lower image display portions 51 and 52 is a portion existing within a field of view of a hypothetical camera in the field.

In the main process, the controller 11 determines, if it is before a start of the game, whether or not there has been a game starting instruction via an operation by the player of the keypad 30 or the touch panel 40, and determines, if it is during an execution of the game, whether or not it is time to carry out a situation change (for example, a change of the field) (step S101).

The "game starting" means, when selection menu items such as "game start" and "demonstration" have been presented, a starting of a game by selecting "game start". Therefore, there is a case in which an opening movie is played before the starting of the game (a case in which it is automatically played by turning on power), and a case in which it is played after the starting of the game (a case in which it is played in accordance with there having been the game starting instruction from the player).

The time at which the situation change is carried out, determined in step S101, means a time at which, for example, in order to finish a situation which has been displayed thus far on the upper and lower image display portions 51 and 52 (for example, a situation being expressed by the hypothetical three-dimensional space, or a situation being expressed by a moving image effect created by a movie image), and switch to a new situation, a hypothetical three-dimensional space which shows the new situation is displayed on the upper and lower image display portions 51 and 52.

When it is determined that there has been the game starting instruction, or when it is determined that it is the time to carry out the situation change (Y of step S101), the controller 11, in accordance with the control program, determines an initial screen (an initial screen at a time of starting the game, or an initial screen at a time of changing the situation) (step S102).

The initial screen at the time of starting the game means, for example, a screen displayed first when there has been the game starting instruction from the player. Also, the initial screen at the time of changing the situation means, for example, when clearing one stage and shifting to a new stage (when it is time to carry out the situation change), a screen displayed first in the new stage.

The screens and characters used in the game with the video game apparatus 100 of the embodiment, or various kinds of data such as icons, are stored in the storage medium 70. In step S102, an initial display position of the player character PC, non-player characters NPC to be displayed, and initial display positions thereof, icons to be displayed, and initial display positions thereof, and the like, on the initial screen or in the situation after changing (for example, the new stage), are determined in accordance with the control program.

After that, the controller 11, in accordance with the control program, determines a position of a point of view, a direction of a visual axis, and a size of the field of view of the hypothetical camera, and carries out an initial setting of the hypothetical camera for carrying out a perspective transform (step S103). Then, the controller shifts to step S115, to be described hereafter.

When it determines that it is during the execution of the game but not time to carry out the situation change (N of step S101), the controller 11 accepts instruction data based on an operation by the player of the keypad 30 or the touch panel 40 (step S104). That is, it determines whether or not instruction data for executing the actions and the like of the player character PC have been input via the keypad 30 or the touch panel 40 and, if valid instruction data (meaning instruction data for which a reception is permitted) have been input, the controller 11 accepts the instruction data.

In the embodiment, for example, a setting is done in advance in such a way that a player character PC displayed on the upper image display portion 51 can be operated by the keypad 30, and a player character PC displayed on the lower image display portion 52 can be operated by the touch panel 40. Also, the setting being such that, with regard to the player character PC displayed on the upper image display portion 51, the movement is not permitted, processes of a next step S105 to step S107 are taken to apply only to the player character PC displayed on the lower image display portion 52.

It is also acceptable that it is a setting whereby the player characters PC operable by the keypad 30 and the touch panel 40 are interchanged, or that it is a setting whereby an operable player character PC differs for each of the cross key 31 and button group 32 on the keypad 30 or, in a case in which a detection area of the touch panel 40 is segmented, for each detection area.

If the controller 11 has accepted instruction data for instructing behavior relating to the movement in step S104 (movement instruction data: a selection of a movement command on the touch panel 40 with the touch pen 41, a movement instruction to the player character PC on the lower image display portion 52 (that is, on the touch panel 40) with the touch pen 41, or the like) (Y of step S105), in accordance with an operation (a movement operation) of the touch panel 40 for instructing the behavior of the player character PC relating to the movement, the controller 11 executes a movement process in accordance with the accepted movement instruction data (step S106).

In the movement process of step S106, the controller 11 moves a position of the player character PC in the hypothetical space (on a current field) in accordance with the accepted movement instruction data. As the movement command there is, for example, a dash instruction command and the like. The dash instruction command, being a command for moving the player character PC swiftly, is a command for, in the event that the battle is in progress, giving an instruction to move swiftly from a predetermined area of the battle area to another area.

After that, the controller 11 generates movement information, based on position information of the player character PC which derives from the movement process (step S107). That is, in accordance with the movement of the position of the player character PC due to the movement process, the controller 11 updates necessary data, from among the position of the point of view, the direction of the visual axis, and the size of the field of view of the hypothetical camera, and carries out a changing of setting details of the hypothetical camera.

The movement information generated in step S107 includes various kinds of data relating to the movement, such as the position of the player character PC after the movement, and the position of the point of view, the direction of the visual axis, and the size of the field of view of the hypothetical camera changed by the movement of the player character PC. Then, the controller 11 shifts to step S113.

If the controller 11 has accepted instruction data for instructing behavior relating to the battle in step S104 (battle instruction data: a battle command) (Y of step S108), in accordance with an operation (a battle operation) of the keypad 30 or the touch panel 40 for instructing the behavior of the player character PC relating to the battle, the controller 11 executes a battle process in accordance with the accepted battle instruction data (step S109).

In the video game apparatus 100 of the embodiment, specifically, in the event that an operation input for instructing the behavior for carrying out the battle has been carried out with respect to the player character PC, by means of an input operation using the cross key 31 or the button group 32 of the keypad 30, or an input operation with the touch pen 41 on the touch panel 40, the controller 11 determines that it has accepted the battle instruction data (Y of step S108), and executes the battle process (step S109). In the battle process carried out in step S109, the controller 11 executes, for example, a process determining a result of a battle, and a course of a battle, between an enemy character which is a battle opponent, and the player character PC, and the like.

After that, the controller 11 generates battle information based on the result of the battle and the course of the battle determined by the battle process (step S110). That is, in accordance with the result of the battle and the course of the battle emanating from the battle process, the controller 11 carries out an update and a setting of necessary data, from among names of the player character PC and the enemy character which have fought, a course of a fight, a result of the fight, parameters regulating a capability of the player character PC, and the like. The battle information includes various kinds of data relating to the battle, such as the names of the player character PC and the enemy character which have fought, the course of the fight, the result of the fight, and the parameters regulating the capability of the player character PC. Then, the controller 11 shifts to step S113, to be described hereafter.

If, in accordance with an operation (another operation) of the keypad 30 or the touch panel 40 for carrying out another instruction, the controller 11 has received instruction data for the other instruction (other instruction data: another command) in step S104 (Y of step S111), the controller 11 executes a process (for example, a conversation, a purchase, a pick up, a moving of an item, or the like) in accordance with the other instruction data received (step S112). Then, other items of information are generated corresponding to a process result of step S112, and the controller 11 shifts to step S113.

In step S113, the controller 11, by storing the movement information generated in step S107 in a predetermined data area of the RAM 12, updates a current position of the player character PC. Also, in step S113, the controller 11, by storing the battle information generated in step S110, and the other items of information generated after step S112, in a predetermined data area of the RAM 12, stores and holds various kinds of behavior history of the player character PC.

After that, the controller 11 executes a behavior evaluation process, based on the information indicating the behavior history of the player character PC temporarily stored in the RAM 12 (step S114). Specifically, a numeric conversion is done on information for which the numeric conversion is necessary, using a conversion table prepared in advance, and information for which a weighting is necessary is multiplied by a predetermined coefficient, the figures are aggregated, and the score is calculated. Then, by the calculated score being added to a previous score stored in a predetermined data area of the RAM 12, and stored again in the predetermined data area, the score as evaluation information is updated.

Then, the controller 11, in accordance with setting contents of the hypothetical camera and the like, implements a perspective transform of the hypothetical three-dimensional space, including the player character PC and non-player characters NPC to be displayed, from the hypothetical camera onto a hypothetical screen, and carries out a display process for generating a two-dimensional image to be displayed on the upper and lower image display portions 51 and 52 (step S115).

On finishing the display process in step S115, the controller 11 finishes the main process on this occasion. Subsequently, on the timer interruption occurring at a starting time of a next frame period, a next main process is executed. Then, by the main process being repeatedly executed, the character image is switched at every frame period, and the moving image is displayed on the upper and lower image display portions 51 and 52.

Herein, a simple description will be given of the display process in step S115. In step S115, the controller 11, firstly, converts at least coordinates of apices of a polygon, from among coordinates of apices of a polygon configuring the hypothetical three-dimensional space which includes the player character PC, the non-player characters NPC, and the like, included in a range which undergoes the perspective transform onto the hypothetical screen, from coordinates of the world coordinate system to coordinates of a viewing coordinate system.

After that, the controller 11 transmits the coordinates of the apices of the polygon, in the viewing coordinate system, for the player character PC, the non-player characters NPC, and the like, to the graphics processor 15, and transmits the drawing command to the graphics processor 15.

On the drawing command being received, the graphics processor 15, based on the coordinates of the viewing coordinate system, updates contents of a Z buffer for each point configuring each plane, in such a way that data of points in a front side remain. On updating the contents of the Z buffer, the graphics processor 15 moves image data on the remaining points in the front side into the frame memory 19. Also, the graphics processor 15 also carries out a process, such as a shading or a texture mapping, on the moved image data.

Then, the graphics processor 15 sequentially reads the image data moved to the frame memory 19, appends a synchronization signal, generates a video signal, and transmits it to the display device 50. The display device 50 displays an image corresponding to the video signal transmitted from the graphics processor 15 on the upper and lower display portions 51 and 52. By the image on the upper and lower display portions 51 and 52 being switched every one frame time, the player can watch an image including an aspect of the player character PC, the non-player characters NPC, and the like, moving on the field.

With the video game apparatus 100 of the embodiment, the process corresponding to the other operation in step S111 to step S112 can be used in playing the game, for example, in the following way. That is, in the event that a communication has been carried out by a short-range wireless communication (for example, a "surechigai" communication (registered trademark)) which, automatically switching a main unit/sub-unit relationship, relating to the communication, with a video game apparatus main body, which another player is using, existing within a neighboring predetermined range of the video game apparatus main body 10 which one player is using, and searching for a communication partner, automatically connects in the event that a communication partner has been found and, after carrying out an exchange of data (information), severs the connection, information relating to the video game is transmitted and received (exchanged) in the event that a predetermined condition has been fulfilled, the information is not transmitted or received in a specified case, even though the predetermined condition has been fulfilled, or communication history information is used even though the predetermined condition has not been fulfilled. Because of this, as well as increasing an interest in the game, a new game element of increasing a variety is realized.

Specifically, with the video game apparatus 100 of the embodiment, for example, a format is employed which, when the game apparatus main body which is the communication partner is found within the neighboring predetermined range of the game apparatus main body 10, and a communication process is executed, referring to terminal category information which indicates a category of each terminal, terminal identification information for identifying each terminal, as well as software identification information for identifying software included in each terminal, a time stamp, and the like, determines, for example, as a predetermined condition, "Is it the same category of terminal?", "Is it a terminal which has the same software?", "Is it a terminal which has carried out the communication within a predetermined period?", or the like and, by exchanging exchangeable information, which can be exchanged as information relating to the game, in accordance with a determination result, and using the communication history information, converts the information into usable information, usable in the software of the video game, in such a way that it can be used by the player. Herein, a description will be given of communication processes, including this kind of communication process, in step S112 corresponding to the heretofore described other operation with the video game apparatus 100 of the embodiment.

Figure 3:
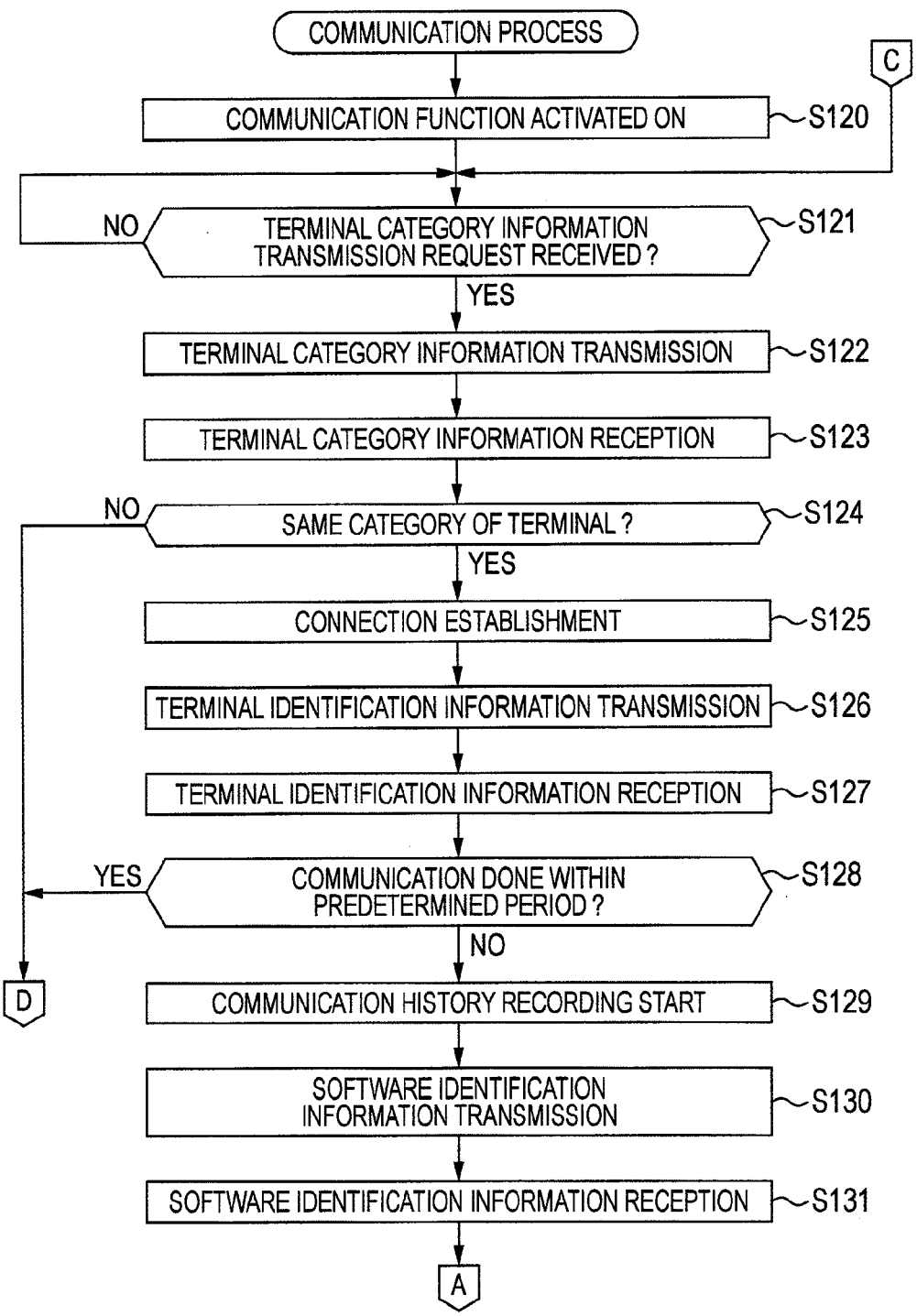
FIG. 3 is a flowchart showing examples of communication processes.
Figure 4:
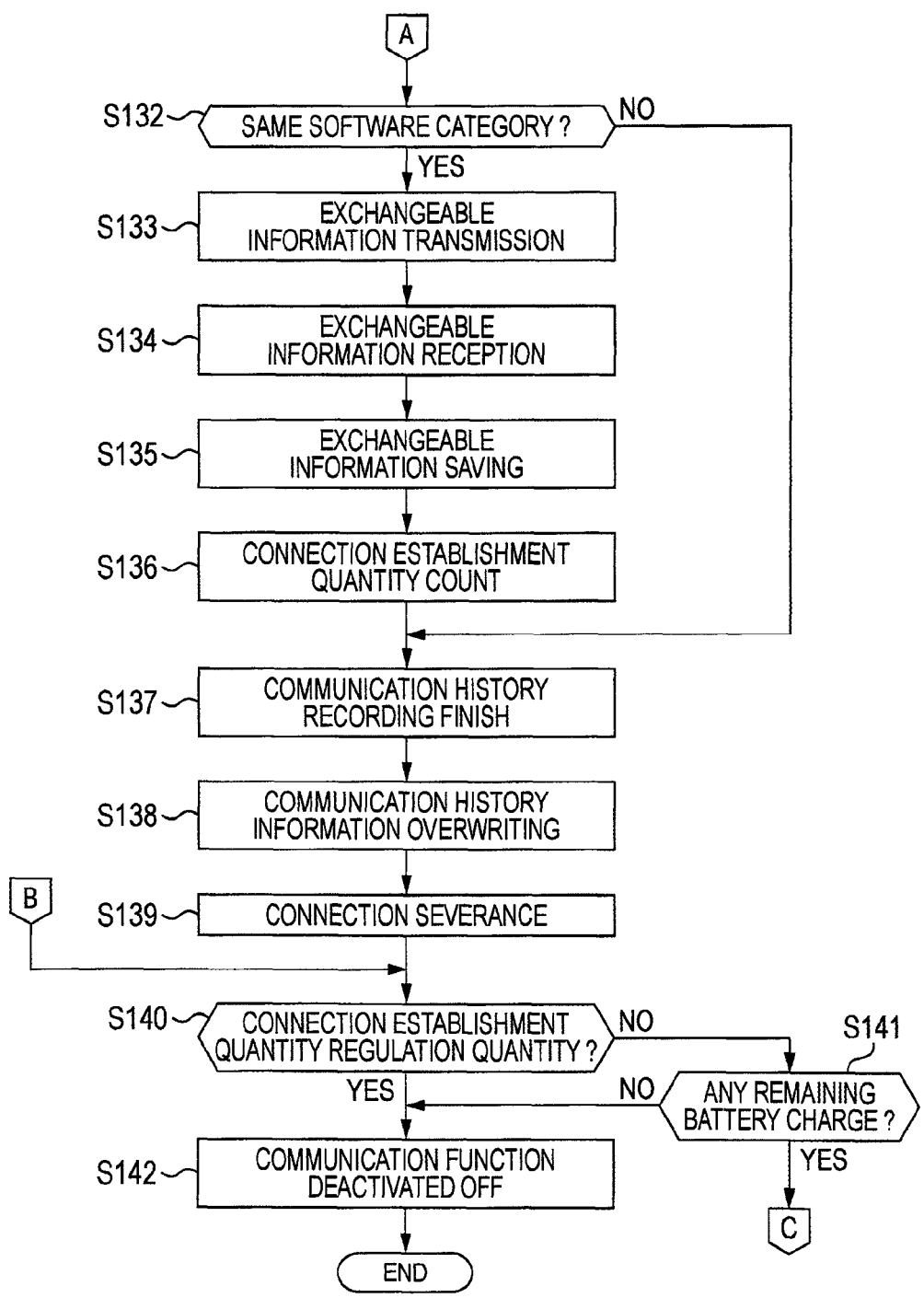
FIG. 4 is a flowchart showing examples of communication processes.
Figure 5:
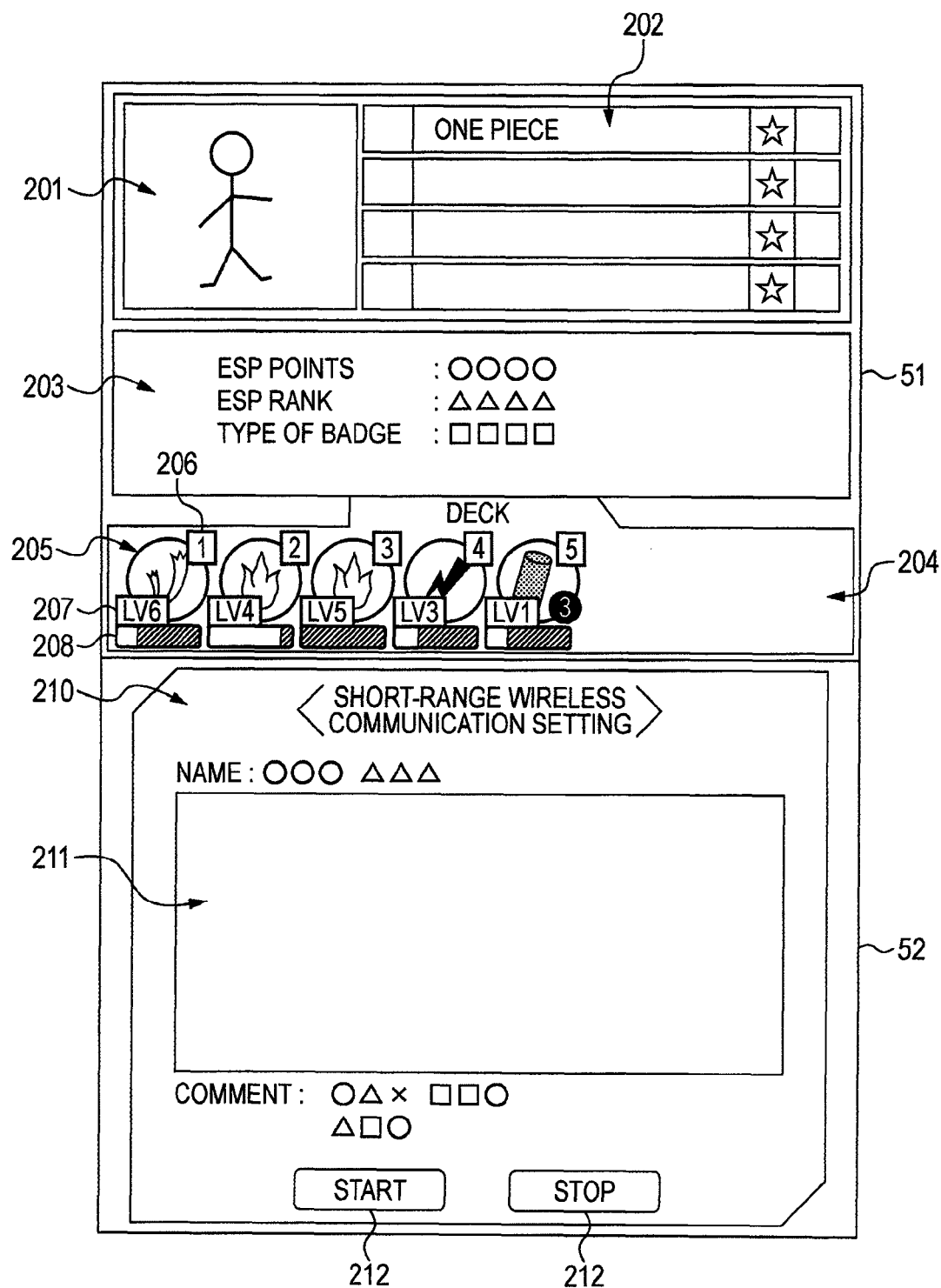
FIG. 5 is an illustration for illustrating an example of a communication setting screen in a display device.

FIGS. 3 and 4 are flowcharts showing examples of the communication processes in the video game apparatus 100 of the embodiment. From this point on, identical reference numerals will be attached to parts which duplicate the already described portions, and a description will be omitted. Firstly, as a precondition for the communication processes being executed, a description will be given of an example of the display screen of the upper and lower image display portions 51 and 52 in the event that an operation input relating to a setting of the short-range wireless communication has been carried out from a main menu, or the like, of a game screen in step S111 in the flowchart shown in FIG. 2. FIG. 5 is an illustration for illustrating an example of a communication setting screen in the display device 50 of the video game apparatus 100 of the embodiment.

As shown in FIG. 5, for example, on the communication setting screen, a player character display area 201 for displaying the player character PC, an equipment display area 202 for displaying equipment of the player character PC displayed in the player character display area 201, a status display area 203 for displaying various kinds of information relating to a current status of the player character PC, and a display determination deck 204 which, for example, determines a display format (a display order and the like) of capability icons for causing the player to select a feasibility level of an attack, an item and the like, usable by the player character PC, displayed on the display screen of the lower image display portion 52 during the battle, are displayed on the upper image display portion 51. From this point on, each capability icon will be described under a name of "badges".

A priority tag 206, which expresses an execution (activation) process priority during the battle in the battle scene, and a level display 207 and level meter 208, which express a capability level of badges 205, are displayed on the badges 205 displayed in the display determination deck 204. Special effects according to capabilities expressed by the badges 205 are set in such a way as to exercise a different effect at every level. Although omitted from the figure, the badges 205 being managed by a badge management table, a type of badge, a level, an effectiveness for one time of use (specific attacking power and recovery power points), remaining points, an action pattern of the touch pen 41 for causing the activation, a necessary experience value, and other information are included in the badge management table.

In the event that the badges 205 are a type of badge relating to an attack, there are various types such as, for example, a "thunder attack", a "fire attack", a "wind blasting attack" and an "object moving attack". Also, in the event that the badges 205 are a type of badge which have an effect on the status of the player character, there are various types such as, for example, an "HP recovery by medicine", an "attacking power increase" and a "defensive power increase".

The level, being set individually for every badge 205, is regulated in such a way that, for example, the higher the level, the greater an effect of the special effect executed by the badge. It may happen that, depending on a type of a kind of badge which exercises a special effectiveness such as, for example, "destroy all enemy characters", as the special effect, the level is not set. The remaining points indicate a usability value (a number of times usable)/a maximum usability value (a maximum number of times usable) of the special effects according to the badges 205.

The necessary experience value regulates an experience value (badge points: BP), for every badge 205, necessary when raising the level to a next one. Apart from this, information which, for example, in the event that the number of times which a special effect according to a badge 205 is usable has become zero, regulates a length of a period (a boot time) for which the capability indicated by the relevant badge 205 is in a condition of being unusable for a certain period (booting condition), until the number of times usable returns to the maximum number of times usable, and information such as a capability name indicated by each badge 205, and a capability ID for uniquely regulating the capabilities indicated by the badges 205, are included.

Herein, as in the heretofore mentioned "action pattern of the touch pen 41", with the video game apparatus 100 of the embodiment, an operation method relating to the attack or the like of the player character PC on the lower image display portion 52 is implemented, for example, in the following way. That is, the player, by carrying out a predetermined input operation such as, for example, "prodding", "rubbing", "surrounding by drawing a frame" or "drawing a line", using the touch pen 41, in an area on the lower image display portion 52 in which is displayed an enemy character the player wishes to attack with the player character PC, or an area on the lower image display portion 52 in which is displayed an object item the player wishes to move toward the enemy character, can carry out an attack or the like corresponding to each input operation.

With the video game apparatus 100 of the embodiment, by so doing, as well as an attack instruction and the like being promptly given to the player character PC, as it is possible to carry out an attack by directly carrying out the input operation, using the touch pen 41, on an image of the enemy character and the like being displayed, it being possible to easily obtain an actual sensation of the operation, it is possible to heighten a player's feeling of reality in the battle scene.

With the video game apparatus 100 of the embodiment, in the event of making the attack or the like by carrying out the heretofore described predetermined input operation, it is necessary that a type of a selectable and executable attack, or the like, is displayed on the display screen of the lower image display portion 52 by a badge 205 which abstractly expresses its contents. For this reason, for example, in the event that an input operation stating "surround by drawing a circle" is correlated in advance, in an operation pattern in the badge management table, to one which instructs an execution of the "fire attack", which attacks the enemy character with fire, it is necessary that something expressing the "fire attack" is included in the badge 205, which is stored in the display storage deck 204 and displayed on the display screen. A predetermined input operation such as "surround by drawing a circle" not being limited to one using the touch panel 40 and the touch pen 41, it is also acceptable to configure in such a way as to implement using, for example, an input device such as the mouse, the joystick or a trackball which are not shown in the figure.

Meanwhile, on the communication setting screen, a profile display screen 210, for displaying the player's user profile, being displayed on the lower image display portion 52, a picture display area 211 for, as well as correlating a picture, character or the like, which the player has drawn of his or her own free will, with the user profile, displaying it as a sticker stuck on a background image or the like during the game, a "start" button 212 for instructing a start of the short-range wireless communication, and a "stop" button 213 for instructing a finish of the display on the communication setting screen, are displayed on the profile display screen 210. Also, a name display area, which displays a freely determined player's name, and a comment display area, which displays a freely determined player's comment, are provided on the profile display screen 210.

In the communication setting screen configured in this way, by the player selecting and pressing the "start" button 212 on the profile display screen 210, with the touch pen 41 or the like, as shown in FIG. 3, the controller 11, controlling the communication interface 17, puts the communication function into an activated condition so that a transmission and reception of the various kinds of information is possible (step S120) and, as well as delivering a terminal category information transmission request, waits until it receives a terminal category information transmission request transmitted from the other video game apparatus main body existing within the neighboring predetermined range (N of step S121) and, if it has been received (Y of step S121), transmits the terminal category information of the video game apparatus main body 10 to the other video game apparatus main body (step S122).

Having transmitted the terminal category information, the controller 11 receives the terminal category information from the other video game apparatus main body (step S123), compares the received terminal category information and the terminal category information of the video game apparatus main body 10, and determines whether or not the other video game apparatus main body and the video game apparatus main body 10 are terminals of the same category (step S124).

If it determines that they are terminals of the same category (Y of step S124), the controller 11 establishes a connection with the other video game apparatus main body by means of a one-on-one wireless communication (step S125), and transmits the terminal identification information, such as a terminal ID, for individually identifying the terminal, to the other video game apparatus main body, by means of the wireless communication (step S126).

Having transmitted the terminal category information, the controller 11 receives the terminal category information from the other video game apparatus main body by means of the wireless communication (step S127), determines whether the received terminal category information is the same as the terminal category information expressed by the communication history information already stored in the RAM 12 or the like, and so on and, by referring to the time stamp expressed by the communication history information, determines whether or not the other video game apparatus main body is a terminal which has carried out the communication with the video game apparatus main body 10 within a predetermined period (for example, one hour) (step S128).

If it determines that it is not a terminal which has carried out the communication within the predetermined period (N of step S128), the controller 11 starts a recording of the communication history information, which indicates a communication history arising from the wireless communication, into the RAM 12 or the like (step S129), and transmits the software identification information, such as a software ID for identifying video game software which the video game apparatus main body 10 is using (is equipped with), to the other video game apparatus main body (step S130).

Having transmitted the software identification information, the controller 11 receives the software identification information for video game software which the other video game apparatus main body is using (is equipped with) from the other video game apparatus main body (step S131), compares the received software identification information and the software identification information of the video game apparatus main body 10, and determines whether or not the types of software are the same, as shown in FIG. 4 (step S132).

If it determines that the types of software are the same (Y of step S132), the controller 11 transmits exchangeable information, exchangeable with regard to the software, to the other video game apparatus main body (step S133), receives exchangeable information from the other video game apparatus main body (step S134), and saves the received exchangeable information in the RAM 12 or the like (step S135). As the exchangeable information, for example, information relating to a badge indicating an item freely designated for exchange in advance, or an item of a high scarcity, and the like, from among the badges 205 stored in the display determination deck 204, can be proposed.

Having saved the received exchangeable information, the controller 11 counts a number of times the connection has been established in step S125 (step S136), finishes the recording of the communication history information, which indicates the communication history arising from the wireless communication, into the RAM 12 or the like (step S137) and, in the event that there is already communication history information in the RAM 12 or the like, overwrites it with the communication history information for which the recording has finished, and saves it (step S138).

Then, the controller 11 severs the connection established with the other video game apparatus main body by means of the one-on-one wireless communication (step S139), determines whether or not the number of established connections counted in step S136 has reached a regulation number (for example, ten) fixed in advance (step S140) and, if it determines that the regulation number has been reached (Y of step S140), controlling the communication interface 17, puts the communication function into a deactivated condition (step S142), and finishes the series of processes according to the flowcharts.

If it determines that the regulation number has not been reached (N of step S140), the controller 11, by measuring a power voltage and the like of the video game apparatus main body 10, determines whether or not there is any remaining battery charge (step S141) and, if it determines that there is remaining battery charge (Y of step S141), shifts to step 121 and repeats the process. If it determines that there is no remaining battery charge (N of step S141), the controller 11, controlling the communication interface 17, puts the communication function into the deactivated condition (step S142), and finishes the series of processes according to the flowcharts.

If it determines in step S124 that they are not terminals of the same category (N of step S124), and if it determines in step S128 that it is a terminal which has carried out the communication within the predetermined period (Y of step S128), the controller 11 shifts to step S140, and carries out a determination process. Also, if it determines in step S132 that the types of software are not the same (N of step S132), the controller 11 shifts to step S137, and finishes the recording of the communication history information.

The exchangeable information and communication history information communicated with the other video game apparatus main body by these kinds of communication process are converted, by the controller 11, into the usable information usable in the software of the video game apparatus main body 10, and used. Consequently, by actively using the various kinds of information communicated between the apparatus, when exchanging the information relating to the game by means of the wireless communication, it is possible to increase the variety in playing the game, while achieving an effective utilization of the communication function.

Figure 6:
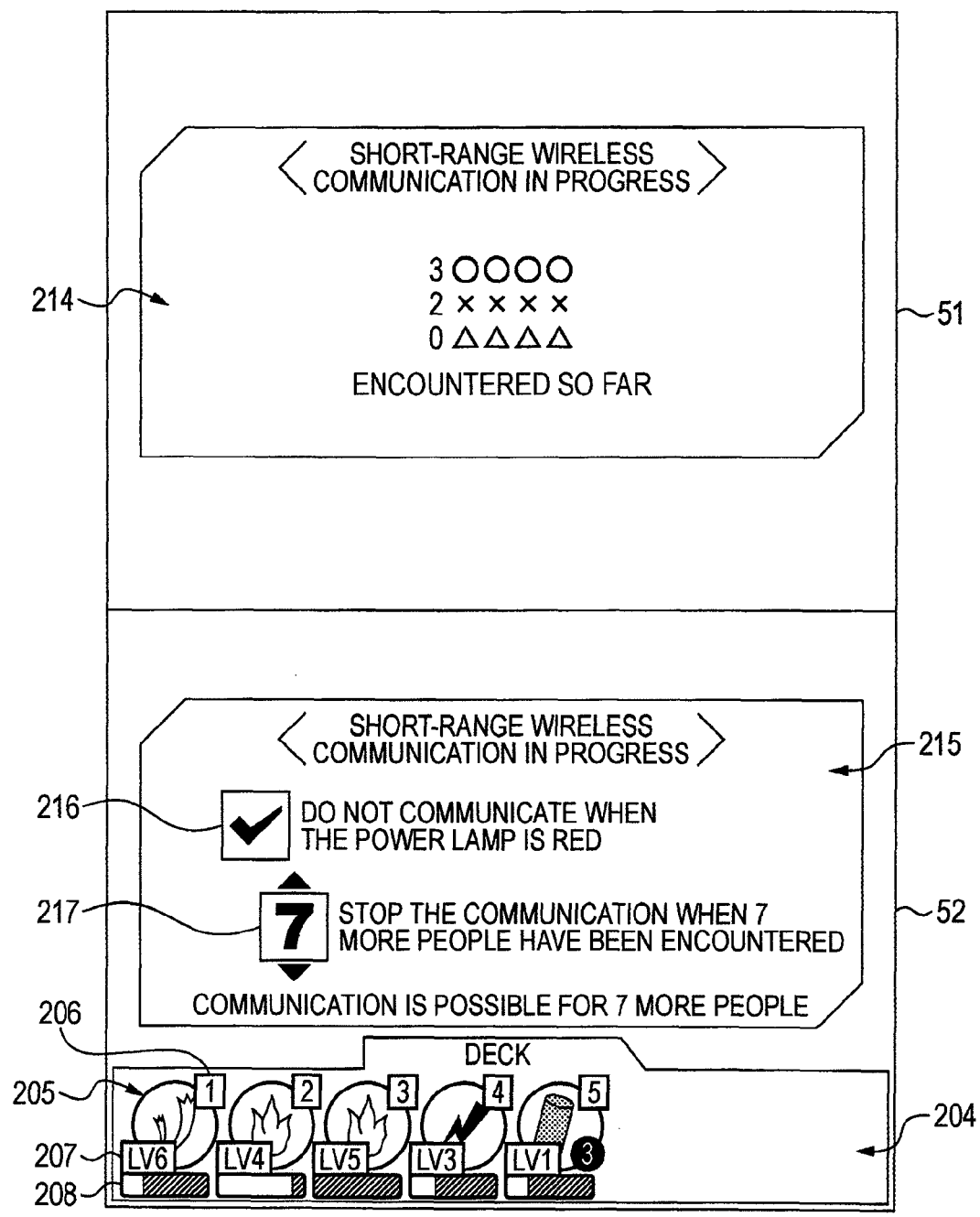
FIG. 6 is an illustration for illustrating an example of a communication-in-progress screen in the display device.

Next, a description will be given of the display screen when the heretofore described kinds of communication process are being carried out with the video game apparatus 100 of the embodiment. FIG. 6 is an illustration for illustrating an example of a communication-in-progress screen in the display device 50 of the video game apparatus 100 of the embodiment.

As shown in FIG. 6, for example, on the communication-in-progress screen, a progress display area 214, for expressing an intermediate progress of the communication, is displayed on the upper image display portion 51, while a communication-in-progress setting display area 215, for expressing an item settable during the communication, and the display determination deck 204, are displayed on the lower image display portion 52. Characters stating "short-range wireless communication in progress", indicating a fact that the communication is in progress, and characters stating "so far . . . have been encountered", indicating a breakdown of other video game apparatus main bodies which the video game apparatus main body 10 has encountered within the neighboring predetermined range during the communication, are displayed in the progress display area 214.

Herein, "○○○○", "XXXX", and "△△△△" displayed in the progress display area 214 are, for example, in the video game apparatus 100 of the embodiment, defined as follows. That is, "○○○○" is counted in a case of encountering another video game apparatus main body which is of the same category of terminal as the video game apparatus main body 10, and is using the same software, while "XXXX" is counted in a case of encountering another video game apparatus main body which, despite being of the same category of terminal as the video game apparatus main body 10, is using different software. "△△△△" is counted in a case not included in the heretofore described conditions.

Then, when communication counted as "○○○○" has been carried out, apart from the heretofore described exchangeable information and the like, information relating to the user profile displayed on the profile display screen 210 is also transmitted and received between each terminal, and saved in each one.

Items for various kinds of communication-in-progress setting being displayed in the communication-in-progress setting display area 215, in the game apparatus main body 10, in the event that a display of a power lamp is set in advance in such a way as to change to green when the remaining battery charge is sufficient, and to turn to red when the remaining battery charge has become low, for example, a check box 216, for setting an item stating "do not communicate when the power lamp is red (that is, when the remaining battery charge is low)", and a number of people setting box 217, for setting a number which indicates a number of people in an item stating "stop the communication when ☐ more people have been encountered", are displayed therein. By making the items settable in this way, it is possible to curb the remaining battery charge, a remaining data memory capacity, and the like, being ignored, and the communication being repeated indefinitely. Apart from this, although omitted from the figure, it is also acceptable that an item stating "inform by sound", or an item stating "inform by vibration", is provided in the communication-in-progress setting display area 215, when the communication is carried out. The number expressed in the number of people setting box 217 is displayed in a condition in which the number has decreased every time the short-range wireless communication has been carried out.

The communication being carried out in this way, for example, in the event that the short-range wireless communication is carried out once each for the number of people set by means of the number of people setting box 217 (that is, a regulation number set in advance), a communication result screen is displayed on the display device 50. At this time, it is also acceptable, making the number of people setting box 217 settable for each category of the communication partner, to make it possible to carry out a kind of control stating "give priority to counting as ○○○○". By so doing, as will be described hereafter, in a kind of case in which points associated with the game are calculated for each category of the communication partner, it is possible to prioritize a count as a communication partner which will be most beneficial for the player over other categories of the communication partner. For example, in a case in which "○○○○" is more beneficial for the player than "XXXX", in a case in which "give priority to counting as ○○○○" has been set, and "stop the communication when 10 more people have been encountered" has been set, in the event of newly encountering a "○○○○" in a condition in which encounters with seven "○○○○" and three "XXXX" have already been counted, it is acceptable to arrange in such a way that one partner's worth of a communication record as "XXXX" is deleted, and encounters with eight "○○○○" and two "XXXX" can be recorded.

Figure 7:
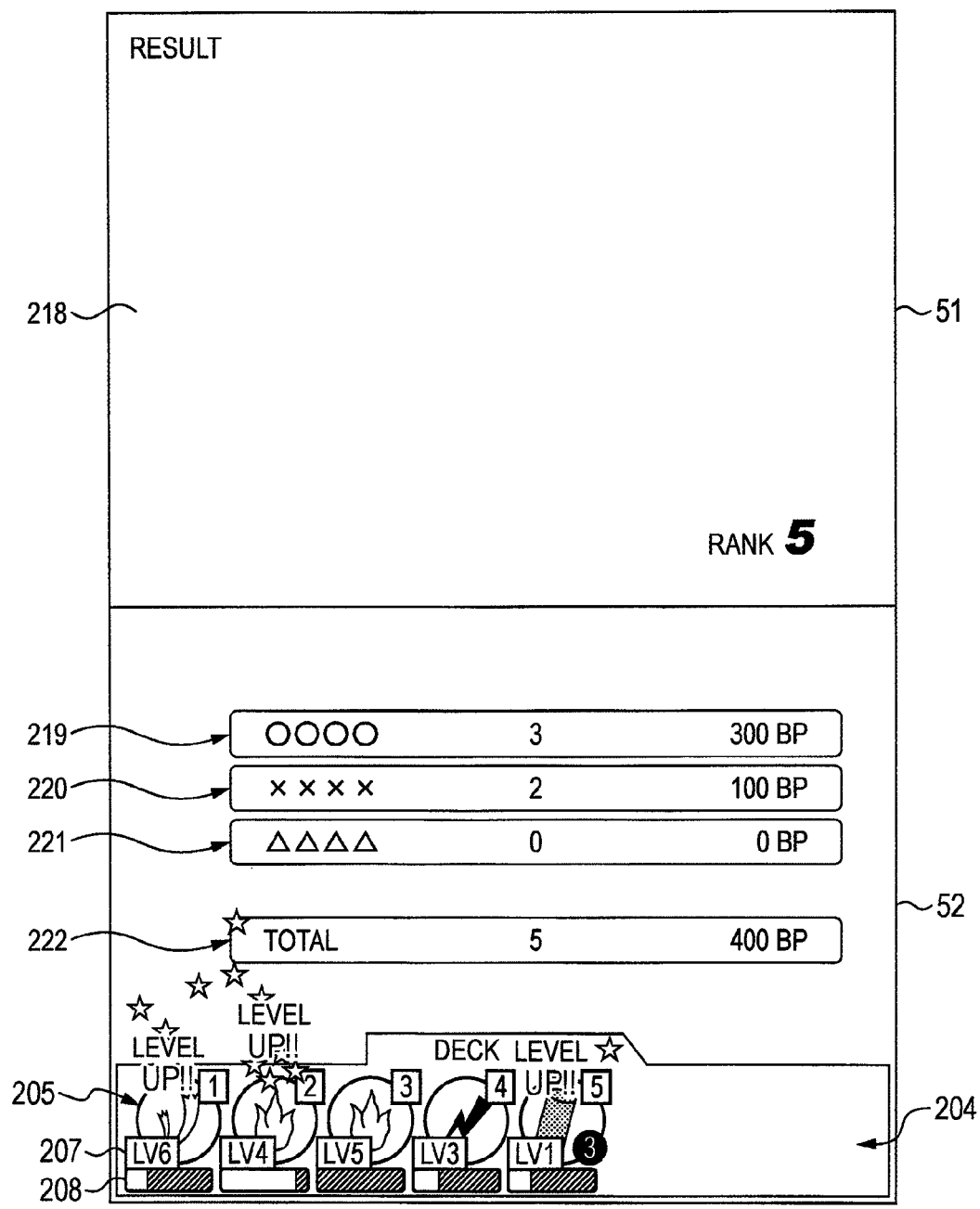
FIG. 7 is an illustration for illustrating an example of a communication result screen in the display device.

FIG. 7 is an illustration for illustrating an example of the communication result screen in the display device 50 of the video game apparatus 100 of the embodiment. As shown in FIG. 7, on the communication result screen, a communication result display area 218, for expressing a communication result, is displayed on the upper image display portion 51, while detailed result display areas 219, 220, 221 and 222, for expressing details of the communication result, and the display determination deck 204, are displayed on the lower image display portion 52. For example, how many "○○○○", "XXXX" and "△△△△" the short-range wireless communication has been carried out with, and how many BP have been obtained as a result, are displayed in the detailed result display areas 219, 220 and 221 respectively, while an overall result arising from the short-range wireless communication is displayed in the detailed result display area 222.

It is sufficient that, in accordance with a difference in a condition of the "○○○○", "XXXX" and "△△△△", and the like, with which the short-range wireless communication has been carried out, the BP are set in such a way that coefficients used in calculating points given for each one differ. For example, it is possible to set at a number of people (a number of times) communicated with X100 BP in the case of "○○○○", a number of people (a number of times) communicated with X50 BP in the case of "XXXX", and a number of people (a number of times) communicated with X300 BP in the case of "ΔΔΔΔ", and the like.

Then, the BP acquired in this way are added to the necessary experience value of the badges 205 stored in the display determination deck 204 and, in the event of attaining a condition of reaching the necessary experience value fixed by the badge management table, the levels of the badges 205 increase. With the video game apparatus 100 of the embodiment, by so doing, it is possible, simply by carrying out the short-range wireless communication, to carry out the playing of the game using not only the information relating to the game, but also the communication history information. As the communication history information expressing the communication result and the like is saved in the video game apparatus main body 10, the player can browse it at any time.

Figure 8:
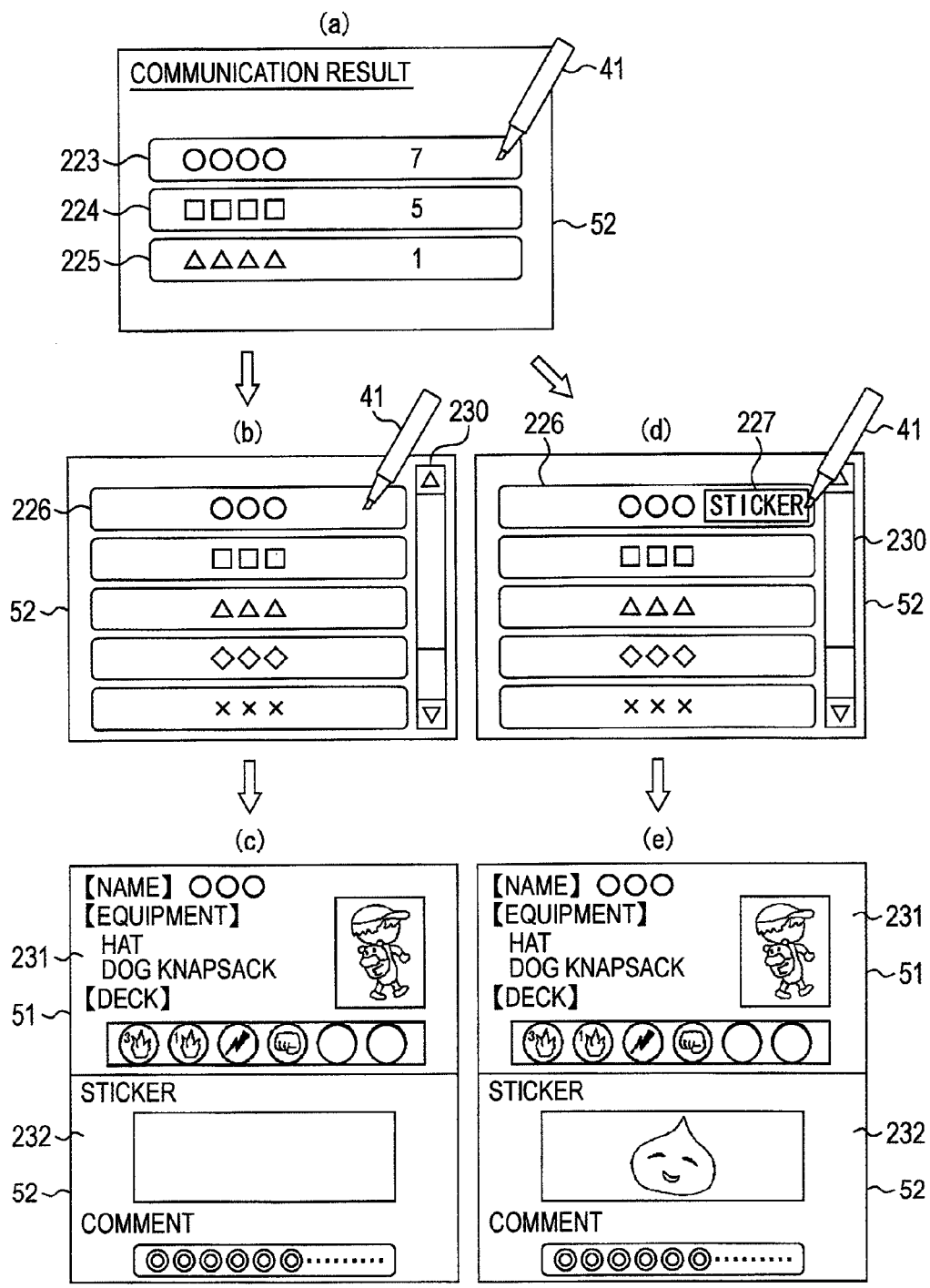
FIGS. 8A to 8E are illustrations for illustrating an example of a browsing procedure of the communication result screen in the display device.

FIGS. 8A to 8E are illustrations for illustrating an example of a browsing procedure of the communication result screen in the display device 50 of the video game apparatus 100 of the embodiment. As shown in FIG. 8A, on selecting a communication result browsing menu from the main menu or the like, the communication result, including detailed result display areas 223, 224 and 225 for expressing a detailed result of the short-range wireless communication with "○○○○", "XXXX" and "ΔΔΔΔ", is displayed on the lower image display portion 52.

Then, for example, on making a selection decision of the detailed result display areas 223 to 225 it is wished to browse, using the touch pen 41 or the like, a list display area 226, for a profile of another user already communicated with (already saved), included in the detailed result is displayed, as shown in FIG. 8B, and, on making a selection decision of an optional user profile from the list display area 226, using the touch pen 41 or the like, details of the user profile for which the selection decision has been made are displayed on the upper and lower image display portions 51 and 52, as shown in FIG. 8C. A movement of a display item in the list display area 226 can be carried out by operating a slider 230.

A content display area 231, for displaying contents of a user profile expressed by means of user profile information, is displayed on the upper image display portion 51, and a sticker display area 232, for displaying the user's picture or comment drawn in the picture display area 211, is displayed on the lower image display portion 52. As the sticker displayed in the sticker display area 232 is included in the user profile information in the event that the setting has been done with the sticker having been drawn in advance in the picture display area 211, for example, in the event that there is someone, among other players communicated with, who has set the sticker, a display 227, indicating that the sticker exists, is implemented in the list display area 226, as shown in, for example, FIG. 8D, and, by making a selection decision of the display 227 with the touch pen 41 or the like, it is possible to display and browse the sticker in the sticker display area 232, as shown in FIG. 8E.

It is also acceptable to configure in such a way that a badge 205 acquired by the communication processes, for example, a badge, stored in the display determination deck 204 of a partner in an exchange or the like (the other video game apparatus main body 10), designated to be made available for the exchange or the like or, in the event that there has been no designation, one of a high scarcity, is displayed, for example, during a game being executed in the video game apparatus main body 10 of a receiving side, so as to be available in a predetermined situation or, in the event that a setting is such that a buying and selling of the badge 205 is possible, displayed on a badge list of a badge retailing outlet appearing during the game. Also, it is also acceptable to configure in such a way as to display the sticker included in the user profile information in a predetermined situation during the game. In this way too, as it is possible to reflect an effect of the short-range wireless communication with the other player in the playing of the game, it is possible to further increase the interest in the game.

Figure 9:
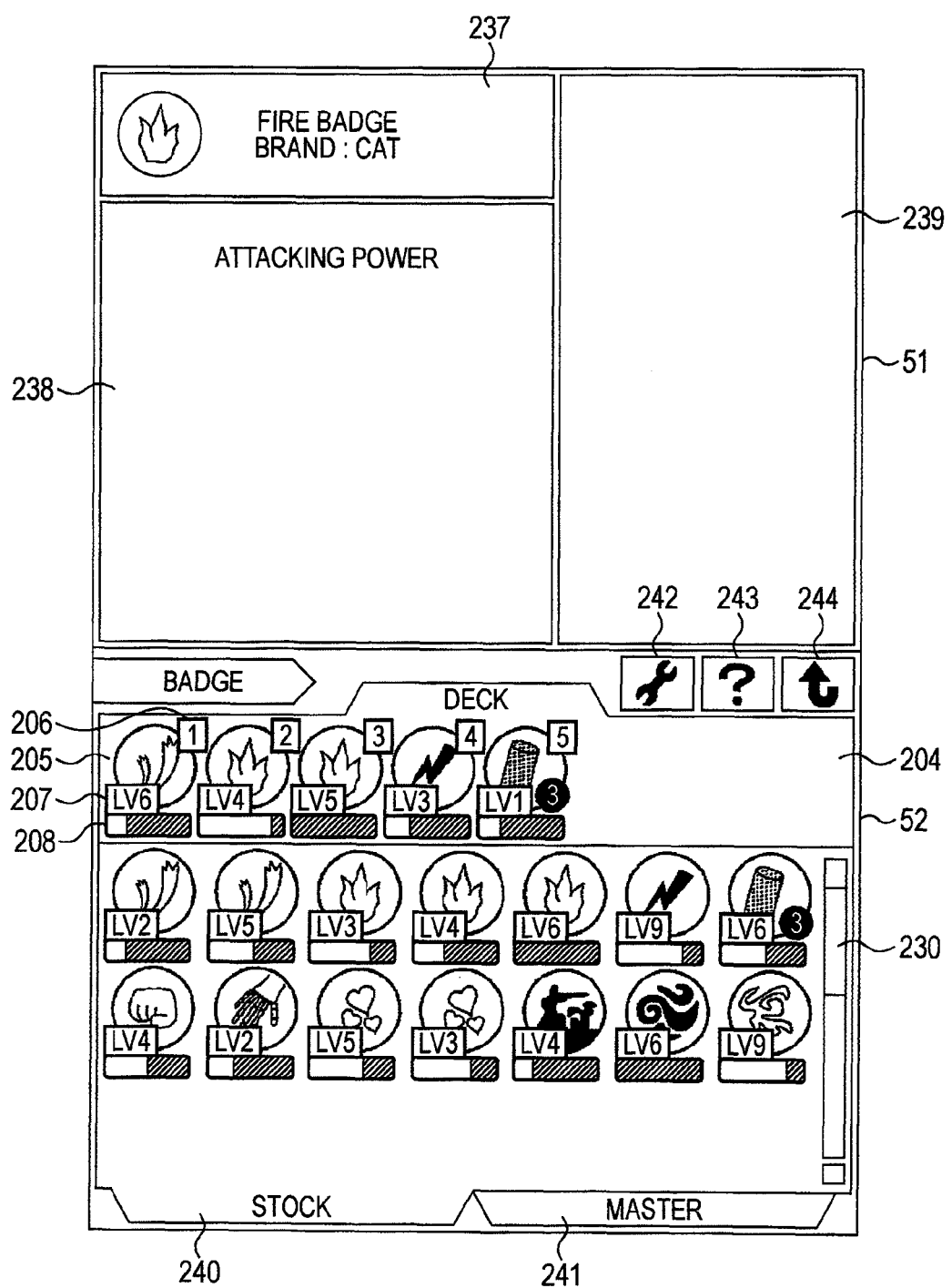
FIG. 9 is an illustration showing an example of a badge setting screen in the display device.

In the video game apparatus 100 of the embodiment, it is possible, on a badge setting screen selectable from the main menu or the like, to carry out various kinds of setting of the badges 205 to be exchanged with the other video game apparatus main body as the exchangeable information, or used in the game as the usable information. FIG. 9 is an illustration showing an example of the badge setting screen in the display device 50 of the video game apparatus 100 of the embodiment.

As shown in FIG. 9, on the badge setting screen, the display determination deck 204, in which the badges 205 are stored, a stock window 240, for displaying an interchangeable badge 205 in the display determination deck 204, and a master window 241, for displaying a badge 205 for which the level has reached a maximum value (a master), are displayed on the lower image display portion 52. The heretofore described kind of slider 230 being provided in the stock window 240 and the master window 241, it is possible to move display positions of the badges 205 displayed by operating the slider 230. Also, a badge help screen, for displaying various kinds of information relating to a badge 205 which the player has last selected, with the touch pen 41, in the display determination deck 204, the stock window 240, the master window 241 or the like, is displayed on the upper image display portion 51.

The badge help screen is configured including a detail display area 237, for displaying an image, a name and the like of the badge 205, an attribute display area 238, for displaying attribute information and the like of the badge 205 displayed in the detail display area 237, and an information display area 239, for displaying other information. Also, an icon 242, for shifting to a customizing screen which customizes sorts of the badges 205 to be displayed in the stock window 240 and the master window 241, an on/off setting of the sorts, a sort reference priority, and the like, an icon 243 for displaying items which the player can operate on the badge setting screen, and an icon 244 for closing the badge setting screen.

Although omitted from the figure, a short cut tag is displayed on a badge 205 for which has been implemented a short cut setting, which is a setting instructing an execution of the special effect according to the capability correlated to one input operation on an input system, and expressed by the badge 205 besides the process priority expressed by the above-described priority tag 206 which is displayed in the display determination deck 204. The short cut tag is displayed in an optional display color, such as red or blue, based on setting conditions. The special effect according to the capability expressed by the badge 205 on which the short cut tag is displayed is executed (activated) immediately by depressing the button group 32, R1 button 36, L1 button 33, or the like, of the keypad 30, as a short cut key which has been subjected to the short cut setting, regardless of the input operation and the like with the touch pen 41.

That is, it is acceptable to set in such a way that, for example, correlating the R1 button 36 with a short cut tag displayed in blue, and correlating the L1 button 33 with a short cut tag displayed in red, it is possible for the player to recognize at a glance the badge 205 which has been subjected to the short cut setting. Also, it is also acceptable to set in such a way that, on depressing the short cut key for executing the capability of the badge 205 which has been subjected to the short cut setting, a badge 205 with a highest process priority, from among the badges 205 displayed in the display determination deck 204, is executed first. In this case, when the badge 205 with the highest process priority is in the booting condition, it is good that a badge 205 with the next process priority is executed. Furthermore, it is also acceptable that the setting is done in such a way that, in the case in which the short cut key has been depressed, any one of the badges 205 for which the short cut setting has been implemented is executed at random. By carrying out the short cut setting in this way, it is possible to increase the interest in the game.

Also, a movement of the badge 205 on the badge setting screen between the display determination deck 204, and the stock window 240 and master window 241, can be carried out by, for example, using the touch pen 41, maintaining a selection of a badge 205 it is wished to move and dragging it to a movement destination. The priority tag 206 is regulated in such a way that, for example, the lower a number being displayed, the higher the process priority. For this reason, with the video game apparatus 100 of the embodiment, it is also possible to set in such a way that, storing badges of the same kind in the display determination deck 204, the player character can acquire special effects of differing levels depending on the process priority.

As heretofore described, with the video game apparatus 100 of the embodiment, in the case in which the communication is carried out with the other video game apparatus main body by the short-range wireless communication, it is not only possible to exchange the badges 205 and the like but, as the configuration is such that it is possible to increase the level of the badges 205 based on the various kinds of information indicated by the communication history information, and possible to play the video game using the user profile of the other player, it being possible to reflect the effect of the other player, and use the various kinds of information acquired by the communication, in a closed game playing space in one video game apparatus 100, it is possible to further increase the interest in the game, and to increase the variety in playing the game, while achieving the effective utilization of the communication function.

As heretofore described, in the heretofore described one embodiment, it is arranged in such a way that the controller 11, in accordance with the request, from the other game apparatus main body which differs from the game apparatus main body 10, to transmit the terminal category information (refer to step S121), transmits the terminal category information to the other game apparatus main body (refer to step S122), receives the terminal category information from the other game apparatus main body (refer to step S123), determines, by comparing the received terminal category information and the terminal category information of the game apparatus main body 10, whether or not the terminal categories are the same (refer to step S124), establishes the connection, in accordance with the determination result, with the other game apparatus main body by means of the one-on-one wireless communication (refer to step S125), transmits the terminal identification information to the other game apparatus main body by means of the wireless communication (refer to step S126), receives the terminal identification information from the other game apparatus main body by means of the wireless communication (refer to step S127), determines, based on the received terminal identification information, whether or not the other game apparatus main body is the terminal which has carried out the wireless communication with the game apparatus main body 10 within the prescribed period (refer to step S128), starts, depending on the determination result, the recording of the communication history information indicating the history of the wireless communication (refer to step S129), transmits the software identification information of the video game included in the game apparatus main body 10 to the other game apparatus main body (refer to step S130), receives the software identification information included in the other game apparatus main body from the other game apparatus main body (refer to step S131), determines, by comparing the received software identification information and the software identification information of the game apparatus main body 10, whether or not the kinds of software are the same (refer to step S132), transmits, depending on the determination result, the exchangeable information on the software to the other game apparatus main body (refer to step S133), receives the exchangeable information from the other game apparatus main body (refer to step S134) and, depending on the determination result of whether or not the kinds of software are the same, finishes the recording of the communication history information (refer to step S137), converts the received exchangeable information into the badge 205, which is the usable information usable by the software of the game apparatus main body 10, along with having finished the recording of the communication history information, and severs the connection by the wireless communication (refer to step S139). Therefore, based on the information such as the terminal category of each apparatus main body, and the kind of software of the video game included in each apparatus main body, even in the event, for example, that there is no uniformity among them, it being possible to actively use the various kinds of information, such as the information on the communication history between the apparatus main bodies, in the video game when exchanging the information relating to the game by means of the wireless communication, it is possible to increase the variety in playing the game, while achieving the effective utilization of the communication function.

Also, in the heretofore described one embodiment, it is arranged in such a way that the controller 11, in the event that the categories of the other game apparatus main body and the game apparatus main body 10 are not the same (refer to step S124), saves the information on the history of the communication with the other game apparatus main body carried out thus far, along with the terminal category information of the other game apparatus main body, and converts the saved communication history information into the usable information. Therefore, it being possible to actively use the communication history information in the video game, even in the event that the categories of the apparatus main bodies are not the same, it is possible to increase the variety in playing the game, while achieving the effective utilization of the communication function.

Also, in the heretofore described one embodiment, it is arranged in such a way that the controller 11, in the event that the categories of the other game apparatus main body and the game apparatus main body 10 are the same (refer to step S124), and the kinds of software are the same (refer to step S132), records the number of times the connection has been established (refer to step S136) and, in the event that the recorded number of times has reached the preset regulation number (refer to step S140), severs the connection by means of the wireless communication. Therefore, in the event that the categories of the apparatus main bodies and the kinds of software are both the same, it is possible to arrange in such a way that the connection by means of the wireless communication is not established a number of times equal to or greater than the regulation number and, it being possible to save the regulation number of items of the communication history information, and actively use them in the video game, without compressing a storage area of the communication history information, it is possible to increase the variety in playing the game, while achieving the effective utilization of the communication function.

Also, in the heretofore described one embodiment, it is arranged in such a way that the controller 11 displays the converted usable information on the display screen as the badge 205, which indicates the feasibility level for giving the special effect to the behavior of the player character PC (refer to FIG. 9 etc.) and, along with the badge 205, displays at least one from among a remaining feasibility value or the level of the feasibility level, on the display screen by means of, for example, the level display 207, the level meter 208, or the like. Therefore, while increasing the interest in the game by displaying the various kinds of information relating to the feasibility level of the player character PC on the display screen efficiently, and easily viewable by the player, it is possible, actively using the various kinds of information arising from the wireless communication in the video game, to achieve the effective utilization of the communication function, and increase the variety in playing the game.

Also, in the heretofore described one embodiment, it is arranged in such a way that the controller 11 displays the remaining feasibility value and the level on the display screen by means of alphanumeric characters or a meter (that is, the level display 207 or the level meter 208). Therefore, while increasing the interest in the game by displaying the various kinds of information relating to the feasibility level of the player character PC on the display screen efficiently, and easily viewable by the player, it is possible, actively using the various kinds of information arising from the wireless communication in the video game, to achieve the effective utilization of the communication function, and increase the variety in playing the game.

Also, in the heretofore described one embodiment, the video game apparatus main body 10 and the display device 50 are configured as separate entities, but it is also acceptable to have a configuration in which the display device 50 is included in the video game apparatus main body 10, and it is also acceptable to have a configuration in which the display device 50 is equipped with even more image display portions, other than the upper and lower image display portions 51 and 52. Also, it is also acceptable that the display device 50 is configured in such a way that, dividing one image display portion into a plurality of display areas, the same kind of effect is acquired.

Also, in the heretofore described embodiment, the description of the RPG game control is given but, it naturally being possible to apply the invention to a game of a similar kind, such as a gun action RPG, furthermore, as well as it also being possible to suitably apply the invention to other kinds of game, it is possible for one or a plurality of players to play.

Also, in the heretofore described embodiment, the video game apparatus 100 is described as the example but, as long as it is an instrument equipped with an image generating function, it is possible to apply the invention to various kinds of instrument, such as a personal computer, a portable telephone terminal, or a portable game machine. In the event that the invention is applied to the portable game machine or the like, it is preferable to use a miniature storage medium, such as a semiconductor memory card, in place of the CD-ROM or DVD-ROM, as the heretofore described storage medium 70.

Also, in the heretofore described embodiment, game data (various kinds of data, such as the control program used in the game, and the like), for causing the video game apparatus main body 10 to execute the heretofore described various kinds of process, are stored in the storage medium 70, but it is also acceptable that the game data are distributed by a server system, such as a WWW server. In this case, it is sufficient to arrange in such a way that the video game apparatus main body 10 acquires the game data distributed by the server system via the communication network 80, stores them in the HDD 13, loads the game data from the HDD 13 into the RAM 12, and uses them. Although they have been taken as game data in the heretofore described example, it is sufficient that they are data which include at least the control program for causing a computer to execute the image generating processes in the heretofore described embodiment.

According to the invention, it is useful when applying the invention to the video game apparatus, the personal computer, the portable telephone terminal, the portable game machine, and the like which, as well as controlling the implementation of the video game by displaying the player character on the display screen of the image display device, and controlling the behavior of the player character displayed on the display screen in accordance with the operation by the player, having a function as terminals which carry out the wireless communication, carry out the transmission and reception of the information relating to the video game.

What is claimed is:

1. A video game processing apparatus for controlling an implementation of a video game by controlling behavior of a player character, comprising:
    a terminal category information transceiver configured to transmit and receive, via a network interface, terminal category information to and from a second apparatus body, in response to a request from the second apparatus body to a first apparatus body;
    a terminal category determiner configured to determine, via a processor, whether a second terminal category of the second apparatus body and a first terminal category of the first apparatus body are the same, the terminal category determiner comparing the terminal category information transmitted to and received from the second apparatus body by the terminal category information transceiver;
    a connection establisher configured to establish, via the network interface, a connection between the first apparatus body and the second apparatus body via a wireless communication, based on a first determination from the terminal category determiner;
    a terminal identification information transceiver configured to individually identify the second apparatus body, the terminal identification information transceiver transmitting and receiving, via the network interface, terminal identification information to and from the second apparatus body via the wireless communication;
    a communication determiner configured to determine, via the processor, whether the second apparatus body has performed the wireless communication with the first apparatus body within a predetermined period, based on the terminal identification information received by the terminal identification information transceiver;
    a recording starter configured to start a recording of communication history information of the wireless communication between the first apparatus body and the second apparatus body, based on a second determination by the communication determiner;
    a software identification information transceiver configured to identify software of the video game included in the first apparatus body, the software identification information transceiver transmitting and receiving, via the network interface, software identification information to and from the second apparatus body;

a software determiner configured to determine, via the processor, whether types of software of video games included in the first apparatus body and the second apparatus body are the same, the software determiner comparing the software identification information transmitted to and received from the second apparatus body by the software identification information transceiver;

an exchangeable information transceiver configured to transmit and receive, via the network interface, exchangeable information to and from the second apparatus body, based on a third determination from the software determiner, the exchangeable information indicating information relating to the software and being exchangeable between the first apparatus body and the second apparatus body;

a recording finisher configured to complete the recording of the communication history information, based on a fourth determination from the software determiner;

a first information converter configured to convert the exchangeable information received by the exchangeable information transceiver into first information that is usable by the software of the video game included in the first apparatus body;

a communication history counter configured to count a number of communications between the first apparatus body and the second apparatus body; and a second information converter configured to convert the number of the communications into second information that is usable by the software of the video game included in the first apparatus body, the second information specifying actions that are executable by the player character in the video game, the actions being different than the wireless communication between the first apparatus body and the second apparatus body.

2. The video game processing apparatus according to claim 1, further comprising:

a communication history information saver configured to save the communication history information between the first apparatus body and the second apparatus body and the terminal identification information received from the second apparatus body, when the terminal category determiner determines that the second terminal category of the second apparatus body and the first terminal category of the first apparatus body are not the same, wherein the first information converter converts the communication history information saved by the communication history information saver into the first information that is usable by the software of the video game included in the first apparatus body.

3. The video game processing apparatus according to claim 1, further comprising:

a connection severer configured to sever the connection via the wireless communication between the first apparatus body and the second apparatus body.

4. The video game processing apparatus according to claim 3, further comprising:

a connection establishment quantity recorder configured to record a quantity of connections established by the connection establisher, when the terminal category determiner determines that the second terminal category of the second apparatus body and the first terminal category of the first apparatus body are the same, and the software determiner determines that the types of the software are the same, wherein the connection severer severs the connection via the wireless communication, when the quantity recorded by the connection establishment quantity recorder has reached a predetermined quantity.

5. The video game processing apparatus according to claim 1, further comprising:

a capability icon display configured to display the first information converted by the first information converter on a display screen as a capability icon, which indicates a feasibility level for giving a special effect to the behavior of the player character, wherein the capability icon display indicates one of a remaining feasibility value and the feasibility level on the display screen.

6. The video game processing apparatus according to claim 5, wherein the capability icon display displays the remaining feasibility value and the feasibility level on the display screen via one of alphanumeric characters and a meter.

7. A video game processing method for controlling an implementation of a video game by controlling behavior of a player character, the method comprising:

transmitting and receiving, via a network interface, terminal category information to and from a second apparatus body, in response to a request from the second apparatus body to a first apparatus body;

determining, via a processor, whether a second terminal category of the second apparatus body and a first terminal category of the first apparatus body are the same, by comparing the terminal category information transmitted to and received from the second apparatus body;

establishing, via the network interface, a connection between the first apparatus body and the second apparatus body via a wireless communication, based on a first determination of whether the second terminal category of the second apparatus body and the first terminal category of the first apparatus body are the same;

identifying the second apparatus body by transmitting and receiving, via the network interface, terminal identification information to and from the second apparatus body via the wireless communication;

determining, via the processor, whether the second apparatus body has performed the wireless communication with the first apparatus body within a predetermined period, based on the terminal identification information transmitted to and received from the second apparatus body;

starting a recording of communication history information of the wireless communication between the first apparatus body and the second apparatus body, based on a second determination of whether the second apparatus body has performed the wireless communication with the first apparatus body within the predetermined period;

identifying software of the video game included in the first apparatus body by transmitting and receiving, via the network interface, software identification information to and from the second apparatus body;

determining, via the processor, whether types of software of video games included in the first apparatus body and second apparatus body are the same, by comparing the software identification information transmitted to and received from the second apparatus body;

transmitting and receiving, via the network interface, exchangeable information to and from the second apparatus body, based on a third determination of whether the types of the software are the same, the exchangeable information indicating information relating to the software and being exchangeable between the first apparatus body and the second apparatus body;
completing the recording of the communication history information, based on a fourth determination of whether the types of the software are the same;
converting, via the processor, the exchangeable information received from the second apparatus body into first information that is usable by the software of the video game included in the first apparatus body;
counting a number of the communications between the first apparatus body and the second apparatus body; and
converting, via the processor, the number of the communications into second information that is usable by the software of the video game included in the first apparatus body, the second information specifying actions that are executable by the player character in the video game, the actions being different than the wireless communication between the first apparatus body and the second apparatus body.

8. A non-transitory computer readable medium storing a program for controlling an implementation of a video game by controlling behavior of a player character, the medium comprising:
a terminal category information transceiving code segment executable to transmit and receive terminal category information to and from a second apparatus body, in response to a request from the second apparatus body to a first apparatus body;
a terminal category determining code segment executable to determine whether a second terminal category of the second apparatus body and a first terminal category of the first apparatus body are the same, the terminal category determining code segment comparing the terminal category information transmitted to and received from the second apparatus body by the terminal category information transceiving code segment;
a connection establishing code segment executable to establish a connection between the first apparatus body and the second apparatus body via a wireless communication, based on a first determination from the terminal category determining code segment;
a terminal identification information transceiving code segment executable to individually identify the second apparatus body, the terminal identification information transceiving code segment transmitting and receiving terminal identification information to and from the second apparatus body via the wireless communication;
a communication determining code segment executable to determine whether the second apparatus body has performed the wireless communication with the first apparatus body within a predetermined period, based on the terminal identification information received by the terminal identification information transceiving code segment;
a recording starting code segment executable to start a recording of communication history information of the wireless communication between the first apparatus body and the second apparatus body, based on a second determination from the communication determining code segment;
a software identification information transceiving code segment executable to identify software of the video game included in the first apparatus body, the software identification information transceiving code segment transmitting and receiving software identification information to and from the second apparatus body;
a software determining code segment executable to determine whether types of software of video games included in the first apparatus body and the second apparatus body are the same, the software determining code segment comparing the software identification information transmitted to and received from the second apparatus body by the software identification information transceiving code segment;
an exchangeable information transceiving code segment executable to transmit and receive exchangeable information to and from the second apparatus body, based on a third determination from the software determining code segment, the exchangeable information indicating information relating to the software and being exchangeable between the first apparatus body and the second apparatus body;
a recording finishing code segment executable to complete the recording of the communication history information, based on a fourth determination from the software determining code segment;
a first information converting code segment executable to convert the exchangeable information received by the exchangeable information transceiving code segment into first information that is usable by the software of the video game included in the first apparatus body;
a communication history counting code segment executable to count a number of communications between the first apparatus body and the second apparatus body; and
a second information converting code segment executable to convert the number of the communications into second information that is usable by the software of the video game included in the first apparatus body, the second information specifying actions that are executable by the player character in the video game, the actions being different than the wireless communication between the first apparatus body and the second apparatus body.

9. A video game processing apparatus for controlling an implementation of a video game by controlling behavior of a player character, comprising:
a connection establisher configured to establish a wireless connection between a first apparatus body and a second apparatus body;
a communication history counter configured to count a number of communications between the first apparatus body and the second apparatus body; and
an information converter configured to convert the number of the communications into information that is usable in the video game, the information specifying actions that are executable by the player character in the video game, the actions being different than the wireless communication between the first apparatus body and the second apparatus body.

10. The video game processing apparatus according to claim 9,
wherein the information that is usable in the video game is points that are associated with the video game.

11. The video game processing apparatus according to claim 9, further comprising:
a terminal category determiner configured to determine whether a first terminal category of the first apparatus body and a second terminal category of the second apparatus body are the same; and
a software determiner configured to determine whether types of software of video games being played by the first apparatus body and the second apparatus body are the same, wherein the communication history counter is configured to count the number of the communications between the first apparatus body and the second apparatus body when one of: the first terminal category and the second terminal category are the same and the types of software of the video games being played by the first apparatus body and the second apparatus body are not the same; the first terminal category and the second terminal category are not same; and the first terminal category and the second terminal category are the same and the types of software of the video games being played by the first apparatus body and the second apparatus body are the same.

12. The video game processing apparatus according to claim 9, further comprising:
 a terminal category determiner configured to determine whether a first terminal category of the first apparatus body and a second terminal category of the second apparatus body are the same; and
 a software determiner configured to determine whether types of software of video games being played by the first apparatus body and the second apparatus body are the same,
wherein the communication history counter is configured to count the number of the communications between the first apparatus body and the second apparatus body when: the first terminal category and the second terminal category are the same and the types of software of the video games being played by the first apparatus body and the second apparatus body are not the same; the first terminal category and the second terminal category are not same; and the first terminal category and the second terminal category are the same and the types of software of the video games being played by the first apparatus body and the second apparatus body are the same.

13. The video game processing apparatus according to claim 1, wherein the second information specifies effects that are executable on the player character in the video game.

14. The video game processing apparatus according to claim 1, wherein the second information is determined based on a type of software of the second apparatus body.

15. The video game processing method according to claim 7, wherein the second information specifies effects that are executable on the player character in the video game.

16. The video game processing method according to claim 7, wherein the second information is determined based on a type of software of the second apparatus body.

17. The non-transitory computer readable medium according to claim 8, wherein the second information specifies effects that are executable on the player character in the video game.

18. The non-transitory computer readable medium according to claim 8, wherein the second information is determined based on a type of software of the second apparatus body.

19. The video game processing apparatus according to claim 9, wherein the information specifies effects that are executable on the player character in the video game.

20. The video game processing apparatus according to claim 9, wherein the information is determined based on a type of software of the second apparatus body.

* * * * *